US010884924B2

(12) United States Patent
Ito et al.

(10) Patent No.: US 10,884,924 B2
(45) Date of Patent: Jan. 5, 2021

(54) STORAGE SYSTEM AND DATA WRITING CONTROL METHOD

(71) Applicant: Hitachi, Ltd., Tokyo (JP)

(72) Inventors: Shintaro Ito, Tokyo (JP); Akira Yamamoto, Tokyo (JP); Ryosuke Tatsumi, Tokyo (JP); Takanobu Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 208 days.

(21) Appl. No.: 15/547,984

(22) PCT Filed: Mar. 4, 2015

(86) PCT No.: PCT/JP2015/056420
§ 371 (c)(1),
(2) Date: Aug. 1, 2017

(87) PCT Pub. No.: WO2016/139787
PCT Pub. Date: Sep. 9, 2016

(65) Prior Publication Data
US 2018/0032433 A1 Feb. 1, 2018

(51) Int. Cl.
*G06F 12/08* (2016.01)
*G06F 3/06* (2006.01)
(Continued)

(52) U.S. Cl.
CPC .......... *G06F 12/0804* (2013.01); *G06F 3/061* (2013.01); *G06F 3/0656* (2013.01);
(Continued)

(58) Field of Classification Search
CPC .. G06F 12/0804; G06F 12/0868; G06F 3/061; G06F 3/0611; G06F 3/0613;
(Continued)

(56) References Cited

U.S. PATENT DOCUMENTS 5,729,713 A * 3/1998 Leyrer ................ G06F 12/0888
711/138
5,930,523 A * 7/1999 Kawasaki ............ G06F 9/3001
712/32
(Continued)

FOREIGN PATENT DOCUMENTS

JP 2013-515979 A 5/2013

OTHER PUBLICATIONS

Flash Caching on the Storage Client by Holland (Year: 2013).*
(Continued)

*Primary Examiner* — Paul M Knight
(74) *Attorney, Agent, or Firm* — Procopio, Cory, Hargreaves & Savitch LLP

(57) ABSTRACT

A storage system receives a write request which specifies a logical volume address associated with a RAID group, and makes a first determination whether write target data in accordance with the write request exists in a cache memory. When the first determination result is negative, the storage system makes a second determination whether at least one of one or more conditions is met, the condition being that random write throughput performance is expected to increase by asynchronous de-staging processing of storing the write target data in the RAID group asynchronously to write processing performed in response to the write request. When the second determination result is negative, the storage system selects, for the write request, synchronous storage processing, which is processing of storing the write target data in the RAID group in the write processing and for which a load on a processor is lower than the asynchronous de-staging processing.

10 Claims, 23 Drawing Sheets

(51) Int. Cl.
 *G06F 12/0804* (2016.01)
 *G06F 13/10* (2006.01)
 *G06F 12/109* (2016.01)
(52) U.S. Cl.
 CPC .......... *G06F 3/0659* (2013.01); *G06F 3/0689* (2013.01); *G06F 12/109* (2013.01); *G06F 13/10* (2013.01); *G06F 2212/1044* (2013.01); *G06F 2212/262* (2013.01); *G06F 2212/657* (2013.01)
(58) Field of Classification Search
 CPC .... G06F 3/0634; G06F 3/0656; G06F 3/0659; G06F 3/0689; G06F 12/109; G06F 13/10; G06F 2212/1044; G06F 2212/262; G06F 2212/657
 See application file for complete search history.

(56) References Cited

U.S. PATENT DOCUMENTS

| | | | | |
|---|---|---|---|---|
| 6,145,058 | A * | 11/2000 | Suganuma | G06F 12/0804 711/113 |
| 6,253,290 | B1 * | 6/2001 | Nakamoto | G06F 12/0806 709/213 |
| 6,681,294 | B1 * | 1/2004 | Kato | G06F 12/0862 711/128 |
| 2002/0002656 | A1 * | 1/2002 | Honma | G06F 12/0811 711/122 |
| 2003/0014520 | A1 * | 1/2003 | Rinaldis | G06F 11/2069 709/225 |
| 2003/0084252 | A1 * | 5/2003 | Talagala | G06F 12/0866 711/135 |
| 2005/0193167 | A1 * | 9/2005 | Eguchi | G06F 3/061 711/114 |
| 2006/0047908 | A1 * | 3/2006 | Chikusa | G06F 3/0613 711/114 |
| 2006/0179217 | A1 * | 8/2006 | Ito | G06F 11/1076 711/112 |
| 2008/0082856 | A1 * | 4/2008 | French | G06F 11/2089 714/2 |
| 2011/0283046 | A1 | 11/2011 | Koseki | |
| 2013/0138884 | A1 * | 5/2013 | Kawamura | G06F 12/0866 711/119 |
| 2013/0311685 | A1 | 11/2013 | Kudo et al. | |
| 2014/0189252 | A1 * | 7/2014 | Biswas | G06F 12/0884 711/142 |
| 2014/0372672 | A1 * | 12/2014 | Lokare | G06F 12/126 711/103 |
| 2014/0372700 | A1 * | 12/2014 | Whalley | G06F 12/0811 711/122 |
| 2015/0040135 | A1 * | 2/2015 | Benhase | G06F 3/061 718/104 |
| 2015/0286438 | A1 * | 10/2015 | Simionescu | G06F 12/0866 711/103 |

OTHER PUBLICATIONS

Merriam Webster definition of may (Year: 2019).*
International Search Report and Written Opinion for PCT App No. PCT/JP2015/056420 dated May 19, 2015, 10 pgs.

* cited by examiner

FIG. 6

PDEV management table
51

| Parity group number (511) | Number of PDEVs (512) | PDEV number (513) | RAID level (514) | Type (515) |
|---|---|---|---|---|
| 1 | 8 | 0,1,2,3,4,5,6,7 | RAID5 (7D1P) | SSD |
| 2 | 4 | 8,9,10,11 | RAID1 (2D2D) | SSD |
| 3 | 8 | 12,13,14,15,16,17,18,19 | RAID5 (7D1P) | HDD |
| 4 | 4 | 20,21,22,23 | RAID1 (2D2D) | HDD |
| 5 | 8 | 24,25,26,27,28,29,30,31 | RAID6 (6D2P) | SSD |
| 6 | 8 | 32,33,34,35,36,37,38,39 | RAID6 (6D2P) | HDD |

FIG. 7

VOL management table
52

| Logical Volume number (521) | Parity group number (522) | Start address in parity group (523) | Capacity (524) | Data hit rate (525) | Slot hit rate (526) | Stripe hit rate (527) |
|---|---|---|---|---|---|---|
| 1 | 1 | 0x00000000 | 32 GB | 50% | 50% | 50% |
| 2 | 1 | 0x04000000 | 32 GB | 0% | 0% | 0% |
| 3 | 1 | 0x08000000 | 32 GB | 10% | 60% | 80% |
| 4 | 2 | 0x00000000 | 64 GB | 1% | 5% | 10% |
| 5 | 3 | 0x00000000 | 128 GB | 2% | 30% | 30% |
| 6 | 3 | 0x10000000 | 128 GB | 0% | 0% | 0% |

FIG. 8

Processor management table
53

| Processor number | Operating rate | Cache memory allocation amount | Cache usage rate | Dirty cache rate |
|---|---|---|---|---|
| 0 | 94% | 10 GB | 100% | 65% |
| 1 | 90% | 10 GB | 100% | 65% |
| 2 | 98% | 20 GB | 100% | 65% |
| 3 | 0% | 30 GB | 50% | 30% |
| 4 | 2% | 20 GB | 50% | 0% |
| 5 | 5% | 20 GB | 20% | 10% |

Cache hit/miss determination table
54

| Cache slot address (541) | VOL number (542) | Address in VOL (543) | Attribute (544) | Data existence bitmap (545) | Dirty bitmap (546) | Lock state (547) |
|---|---|---|---|---|---|---|
| 0x00000000 | 0 | 0x00000000 | Clean | 00110011111 | 00000000000 | Released |
| 0x00000001 | 0 | 0x00000001 | Dirty | 00000000011 | 00000000011 | Shared |
| 0x00000002 | 0 | 0x00010000 | Dirty | 00111111111 | 00100000000 | Exclusive |
| 0x00000003 | 1 | 0x00100000 | Dirty | 11111111111 | 11111111111 | Released |
| 0x00000004 | 1 | 0x00005000 | Dirty | 11111111111 | 00000000111 | Shared |
| 0x00000005 | 1 | 0x00050000 | Clean | 11111111111 | 00000000000 | Exclusive |
| - | 0 | 0x00002000 | - | - | - | Exclusive |
| - | 1 | 0x00000020 | - | - | - | Exclusive |

FIG. 22

PDEV management table
51

| Parity group number | Number of PDEVs | PDEV number | RAID level | Type |
|---|---|---|---|---|
| 1 | 8 | 0,1,2,3,4,5,6,7 | RAID5 (7D1P) | Parity operation PDEV |
| 2 | 4 | 8,9,10,11 | RAID1 (2D2D) | SSD |
| 3 | 8 | 12,13,14,15,16,17,18,19 | RAID5 (7D1P) | HDD |
| 4 | 4 | 20,21,22,23 | RAID1 (2D2D) | HDD |
| 5 | 8 | 24,25,26,27,28,29,30,31 | RAID6 (6D2P) | Parity operation PDEV |
| 6 | 8 | 32,33,34,35,36,37,38,39 | RAID6 (6D2P) | HDD |

STORAGE SYSTEM AND DATA WRITING CONTROL METHOD

CROSS-REFERENCE TO RELATED APPLICATIONS

This application is a U.S. National Stage entry of PCT Application No: PCT/JP2015/056420 filed Mar. 4, 2015, the contents of which are incorporated herein by reference.

TECHNICAL FIELD

This invention generally relates to data writing control using a cache memory.

BACKGROUND ART

As a technology relating to a data writing control using a cache memory, a technology disclosed in PTL 1 is known, for example.

CITATION LIST

Patent Literature

[PTL 1]
U.S. Patent Application Publication No. 2013/0311685

SUMMARY OF INVENTION

Technical Problem

In general, asynchronous de-staging is employed as a data writing control using a cache memory. The asynchronous de-staging means to write data in the cache memory to a PDEV (physical storage device) asynchronously to processing of an I/O request from a host system.

According to the asynchronous de-staging, an increase in the data processing efficiency can be expected. However, it is difficult to increase the throughput performance of a random write.

Solution to Problem

A storage system receives a write request which specifies an address of a logical volume associated with a RAID group, and makes a first determination as to whether write target data in accordance with the write request exists in a cache memory. When the result of the first determination is negative, the storage system makes a second determination as to whether at least one of one or more conditions is met, the condition being such that random write throughput performance is expected to increase by asynchronous de-staging processing of storing the write target data in the RAID group asynchronously to write processing performed in response to the write request. When the result of the second determination is positive, the storage system selects the asynchronous de-staging processing for the write request. When the result of the second determination is negative, the storage system selects, for the write request, synchronous storage processing which is processing of storing the write target data in the RAID group in the write processing and for which a load placed on a processor is lower than the asynchronous de-staging processing.

Advantageous Effects of Invention

The throughput performance of the random write can be increased.

BRIEF DESCRIPTION OF DRAWINGS

FIG. 6 is a view illustrating an example of a PDEV management table according to Embodiment 1.
FIG. 7 is a view illustrating an example of a VOL management table according to Embodiment 1.
FIG. 8 is a view illustrating an example of a processor management table according to Embodiment 1.
FIG. 9 is a view illustrating an example of a cache hit/miss determination table according to Embodiment 1.
FIG. 22 is a view illustrating an example of a PDEV management table according to Embodiment 2.

DESCRIPTION OF EMBODIMENTS

Figure 1:
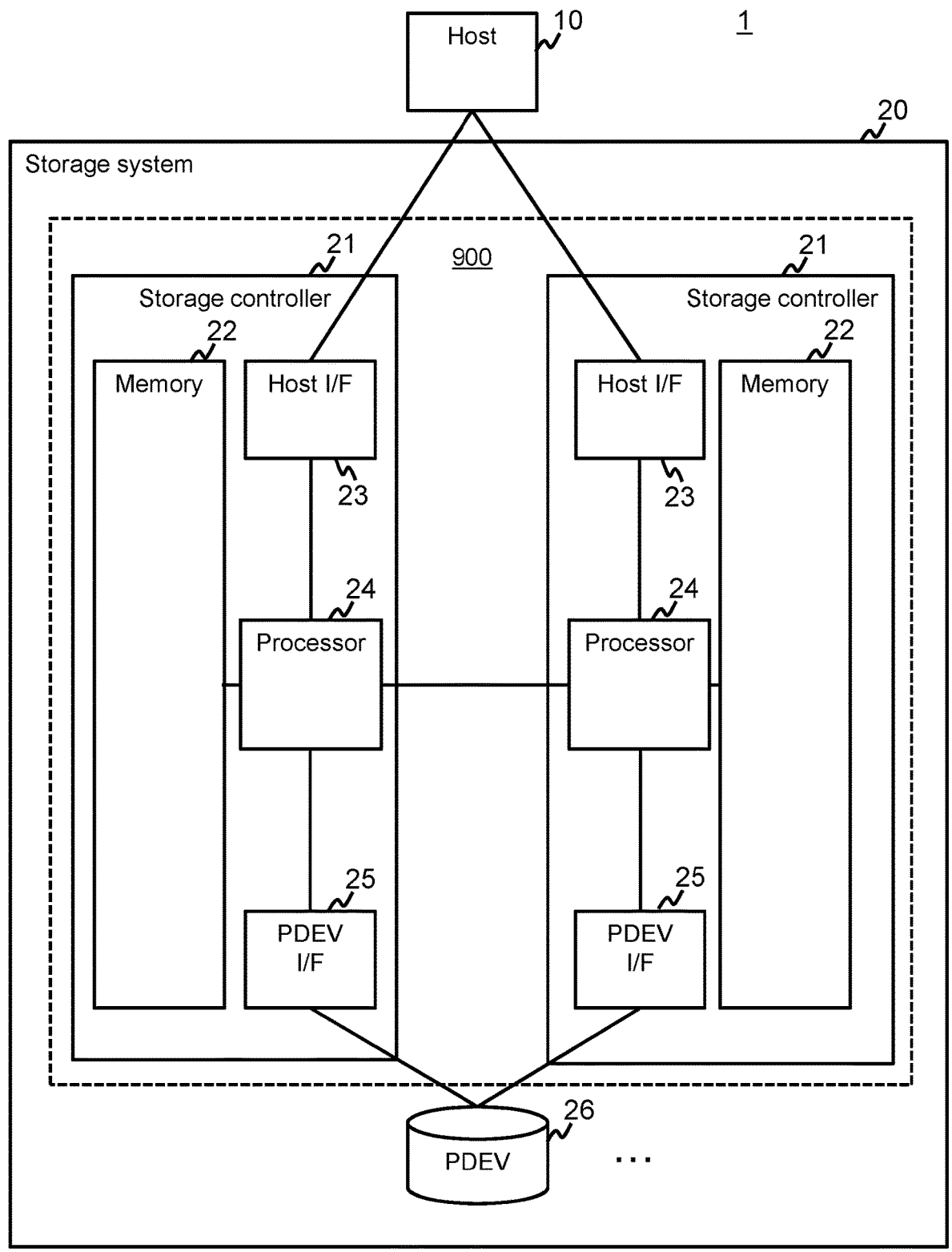
FIG. 1 is a view illustrating a configuration of a computer system according to Embodiment 1.

Several embodiments are described below.

In the following description, information is sometimes described with the expression "xxx table", but the information may be expressed by any kind of data structure. Specifically, the "xxx table" can be referred to as "xxx information" in order to indicate that the information is independent of the data structure. In the following description, the configurations of the tables are examples, and one table may be divided into two or more tables, and all or a part of two or more tables may form one table.

In the following description, numbers are used as IDs (identification information) of various targets, but other type of identification information may be used instead of numbers.

In the following description, a "PDEV" is a physical storage device, and may typically be a non-volatile storage device (for example, an auxiliary storage device). The PDEV may be, for example, an HDD (Hard Disk Drive) or an SSD (Solid State Drive).

In the following description, an "RAID" is an abbreviation of "Redundant Array of Independent (or Inexpensive) Disks". A RAID group is formed of a plurality of PDEVs, and is configured to store data according to a RAID level associated with the RAID group. The RAID group may be referred to as a parity group. The parity group may be, for example, a RAID group configured to store a parity.

In the following description, processing may be described to be performed by a "program", but may be described to be performed by a processor because the program is executed by the processor (for example, a CPU (Central Processing Unit)) to perform a predetermined processing with use of a storage unit (for example, a memory), an interface device (for example, a communication port), and/or the like as appropriate. The processing described to be performed by the program may be processing performed by the processor or an apparatus or a system including that processor. The processor may include a hardware circuit configured to perform a part or all of the processing. The program may be installed in an apparatus such as a computer from a program source. The program source may be a program distribution server or a storage media readable by the computer, for example. When the program source is the program distribution server, the program distribution server includes the processor (for example, the CPU) and the storage unit and the storage unit may further store a distribution program and a distribution target program therein. The processor of the program distribution server may execute the distribution program, to thereby distribute the distribution target program to other computers. In the following description, two or more programs may be implemented as one program and one program may be implemented as two or more programs.

In the following description, a "host system" is a system configured to transmit an I/O request to a storage system, and may include an interface device, a storage unit (for example, the memory), and a processor coupled thereto. The host system may be formed of one or more host computers. At least one host computer may be a physical computer, and the host system may include a virtual host computer in addition to the physical host computer.

In the following description, the "storage system" may be one or more storage apparatuses, and may include a plurality of PDEVs (for example, one or more RAID groups) and a storage controller configured to control I/O to and from the plurality of PDEVs. The storage controller may include a back-end interface device coupled to the plurality of PDEVs, a front-end interface device coupled to at least one of the host system and a management system, a storage unit, and a processor coupled thereto. The storage controller may be redundant.

In the following description, a "VOL" is an abbreviation of the logical volume and may be a logical storage device. The VOL may be a real VOL (RVOL) or may be a virtual VOL (VVOL). The VOL may include an online VOL provided to the host system coupled to the storage system providing the VOL, and an offline VOL that is not provided to the host system (not recognized by the host system). The "RVOL" may be a VOL based on a physical storage unit (for example, one or more RAID groups) of the storage system that includes that RVOL. The "VVOL" may be at least one of an externally-coupled VOL (EVOL), a capacity expansion VOL (TPVOL) and a snapshot VOL. The EVOL may be a VOL that is based on a storage area (for example, the VOL) of an external storage system and is in accordance with storage virtualization technology. The TPVOL may be a VOL that is formed of a plurality of virtual areas (virtual storage areas) and is in accordance with capacity virtualization technology (typically, Thin Provisioning). The snapshot VOL may include a snapshot VOL provided as a snapshot of an original VOL. The TPVOL may typically be an online VOL. The snapshot VOL may be a RVOL. A "pool" is a logical storage area (for example, a set of plurality of pool VOLs) and may be prepared for each application. For example, at least one of a TP pool and a snapshot pool may be serve as the pool. The TP pool may be a storage area formed of a plurality of real areas (real storage areas). A real area may be allocated from the TP pool to the virtual area of the TPVOL. The snapshot pool may be a storage area to which the data that is backed up from the original VOL is stored. One pool may be used as the TP pool or as the snapshot pool. The "pool VOL" may be a VOL forming the pool. The pool VOL may be a RVOL or may be an EVOL. The pool VOL may typically be an offline VOL. Thus, "a VOL associated with the RAID group" may be a RVOL corresponding to the VOL space segmented from the logical space of the RAID group, or may be a TPVOL corresponding to a pool space segmented from the logical space of one or more RAID groups.

Several embodiments are described below.

Embodiment 1

FIG. 1 is a view illustrating a configuration of a computer system according to Embodiment 1.

A computer system 1 includes one or more host systems (hereinafter hosts) 10 and a storage system 20. The host 10 and the storage system 20 are coupled to each other over a communication network such as an SAN (Storage Area Network), for example.

The host 10 transmits an I/O request to the storage system 20. Data that is input and output in response to the I/O request may be hereinafter referred to as "host data". The host data is data used in the host 10. The I/O request includes I/O destination information indicating an I/O destination area. The I/O destination information includes, for example, an LUN (Logical Unit Number) of a VOL serving as the I/O destination, and an LBA (Logical Block Address) belonging to an area of the VOL.

The storage system 20 includes a plurality of PDEVs 26 and a storage controller 900 coupled thereto. The storage controller 900 includes a controller (storage controller unit) 21 multiplexed by N (N is an integer of 2 or more). In this embodiment, the controller 21 is duplicated.

The controller 21 includes a memory 22, a host I/F 23, a PDEV I/F 25, and one or more processors 24 coupled thereto.

The host I/F 23 is an interface device configured to communicate to/from the host 10. The PDEV I/F 25 is an interface device configured to communicate to/from the PDEV 26. The controller 21 is configured to communicate to/from the host 10 via the host I/F 23 and communicate to/from the PDEV 26 via the PDEV I/F 25.

The memory 22 may be a set of one or more memories and may include at least one of a volatile memory and a non-volatile memory. The memory 22 stores a program executed by a processor 24, a table used by the processor 24, data according to I/O processing, and the like therein. The memory 22 may include a cache memory.

The processor 24 executes the program stored in the memory 22, to thereby execute the processing. The processor 24 may transmit and receive commands, data, and the like between another processor 24.

Figure 2:
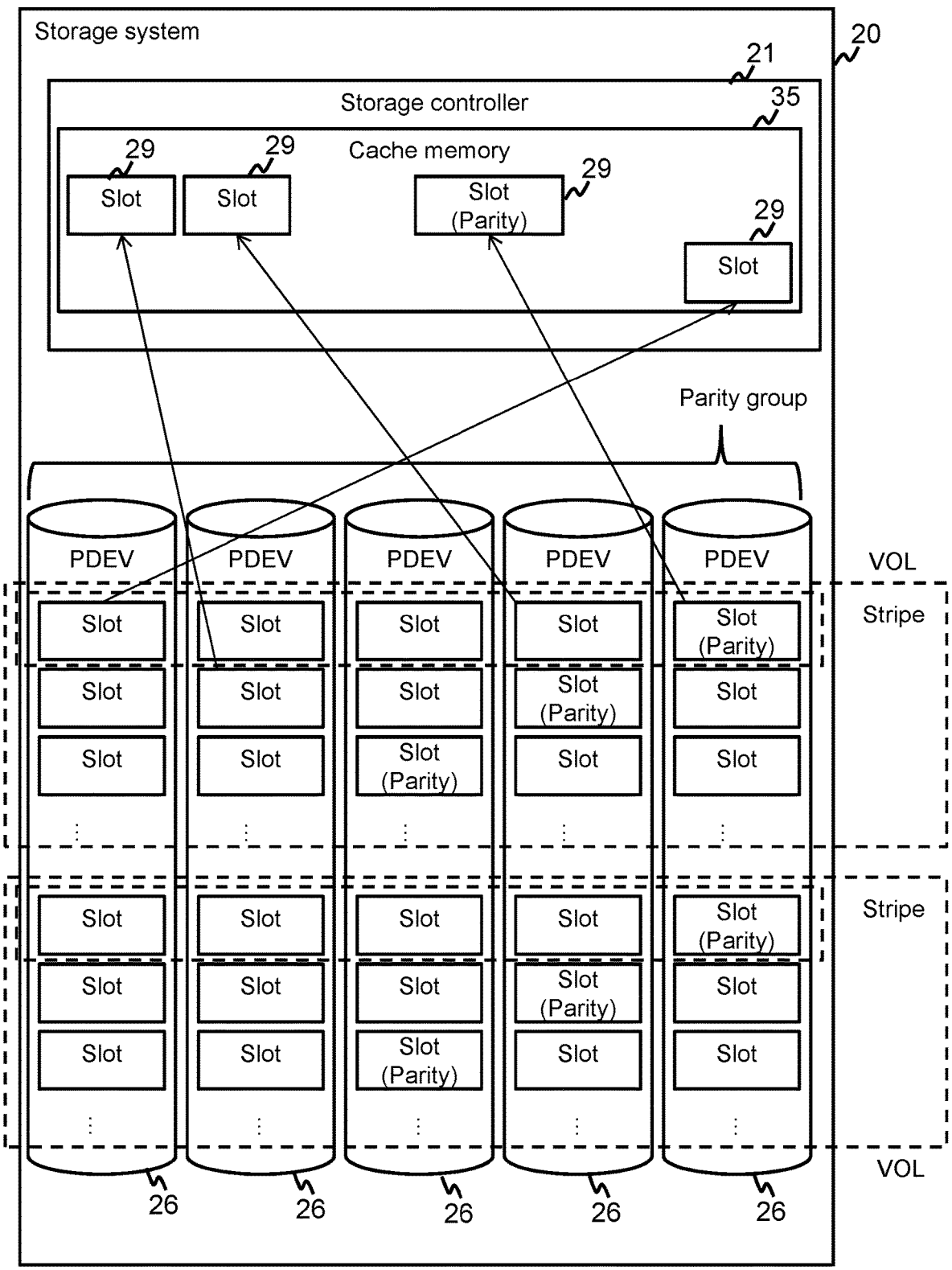
FIG. 2 is a view illustrating a plurality of types of storage areas managed in the storage system according to Embodiment 1.

FIG. 2 is a view illustrating a plurality of types of storage areas managed in the storage system 20.

A parity group (RAID group) is formed of the plurality of PDEVs 26. In the example of the drawing, two VOLs are associated with the parity group. Each of those two VOLs is an RVOL (real VOL). Out of logical spaces provided by the parity group, a VOL space that is a logical space portion allocated to a VOL extends over the plurality of PDEVs forming the parity group.

The VOL space is formed of a plurality of stripes. Each stripe is formed of a plurality of slots corresponding to the plurality of different PDEVs, respectively. The slot is a storage area (logical storage area). Each PDEV provides the plurality of slots. Two or more slots provided by the same PDEV typically do not exist in the same stripe. In the example of the drawing, a RAID level of the parity group is RAID5, and thus the parity is stored in one of the slots in one stripe. Each slot may be formed of a plurality of blocks (logical storage areas). A host data may be written in units of blocks. The block may be 512 B (bytes), for example, and the slot may be 256 kB, for example.

The storage area of a cache memory 35 is reserved in units of slots. Data that is input to and output from the slot associated with the reserved storage area is stored in that storage area. In the following description, the slot in the VOL space may be referred to as a "VOL slot" and the storage area reserved in the cache memory 35 (the storage area associated with the VOL slot) may be referred to as a "cache slot".

In order to make the relationship between the data and the storage area easier to understand, data in units of blocks may be referred to as "block data", data in units of slots may be referred to as "slot data", and data in units of stripes may be referred to as "stripe data". For example, the stripe data may be a set of plurality of slot data corresponding to the plurality of slots forming the stripe. In the example of the drawing, one of the plurality of slot data forming the stripe data is the parity. The slot data may be a set of plurality of block data.

The types and the relationships of the storage areas have been described above.

The types and the relationships of the storage areas in the drawing are examples. For example, the stripe length in the drawing corresponds to the number of the PDEVs forming the parity group, but the stripe length may be shorter than the number of the PDEVs forming the parity group depending on the RAID level and the configuration of the parity group. In other words, the plurality of VOL slots corresponding to all PDEVs may exist in one stripe and at least part of another stripe.

When the VOL is a TPVOL (a VOL in accordance with Thin Provisioning), a real area allocated to a virtual area of the TPVOL may be formed of one or more stripes.

The number of the parities existing in one stripe data may be two or more (for example, when the RAID level is RAID6, two parities exist in one stripe data). As data redundancy technology, a triple mirror (Triplication), triple parity technology using three types of parities, and the like may be employed. As a technology of generating the parity (redundant code), Reed-Solomon coding using Galois operation, EVEN-ODD, and the like may be employed. The RAID level may not necessarily be a RAID level that needs the parity.

Figure 3:
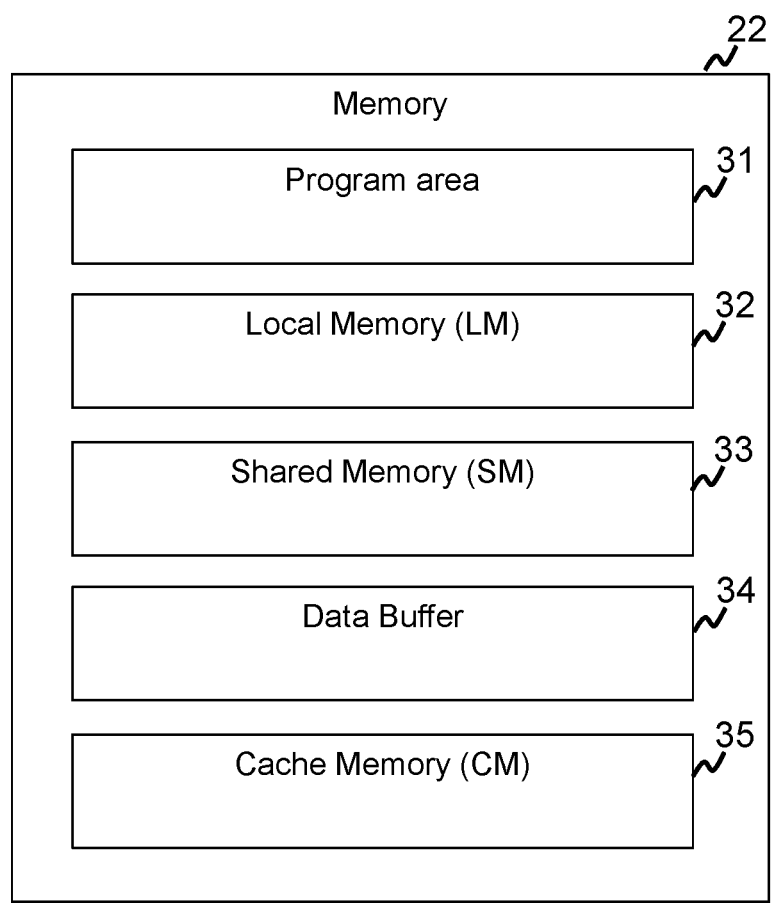
FIG. 3 is a view illustrating a configuration of a memory according to Embodiment 1.

FIG. 3 is a view illustrating a configuration of the memory 22.

The memory 22 includes a program area 31, a local memory (LM) 32, a shared memory (SM) 33, a data buffer 34, and a cache memory (CM) 35.

The program area 31 stores therein a program to be executed by the processor 24.

The local memory 32 stores therein information used by the processor 24 of the controller 21 including the local memory 32 (for example, a table, cache directory information, and a threshold). The cache directory information is information including, for example, a queue of a pointer of the cache slot for each slot state (for example, dirty, clean, or free) (description of the slot state is made later).

The shared memory 33 stores therein information shared by the plurality of controllers 21. The shared memory 33 stores therein, for example, the configuration information of the storage system 20, the main body of the cache directory information stored in the local memory 32, and the like.

The data buffer 34 serves as a temporary storage destination of the data. For example, the data buffer 34 may be used so that an area in the data buffer 34 is reserved for every I/O from the host 10 and the area is released after being used. In processing of a read request from the host 10, the data buffer 34 may serve as the temporary storage destination of the data read from the PDEV 26 by another controller 21 that is different from the controller 21 including that data buffer 34. In processing of a write request from the host 10, the data buffer 34 may serve as the temporary storage destination of the write target data to be stored in the cache memory 35. By using the data buffer 34 in this way, the data cached in the cache memory 35 is not destroyed even if the transmission of the write target data by overwriting (by writing in the same area as an area in which data already exists) from the host 10 is blocked.

Data that is read from the PDEV 26 or the write target data in the PDEV 26 is cached in the cache memory 35. Even if the data is read from the cache memory 35, the data remains in the cache memory 35. The cache memory 35 and the data buffer 34 are similar to each other in that the cache memory 35 and the data buffer 34 both serve as the temporary storage destination of the data, but are different from each other in that the read data remains in the cache memory 35 and the read data does not remain in the data buffer 34. In the cache memory 35, the area is reserved in units of slots as described above and data is stored in the reserved area (cache slot). The capacity of the cache slot is the same as the capacity of the VOL slot.

Figure 4:
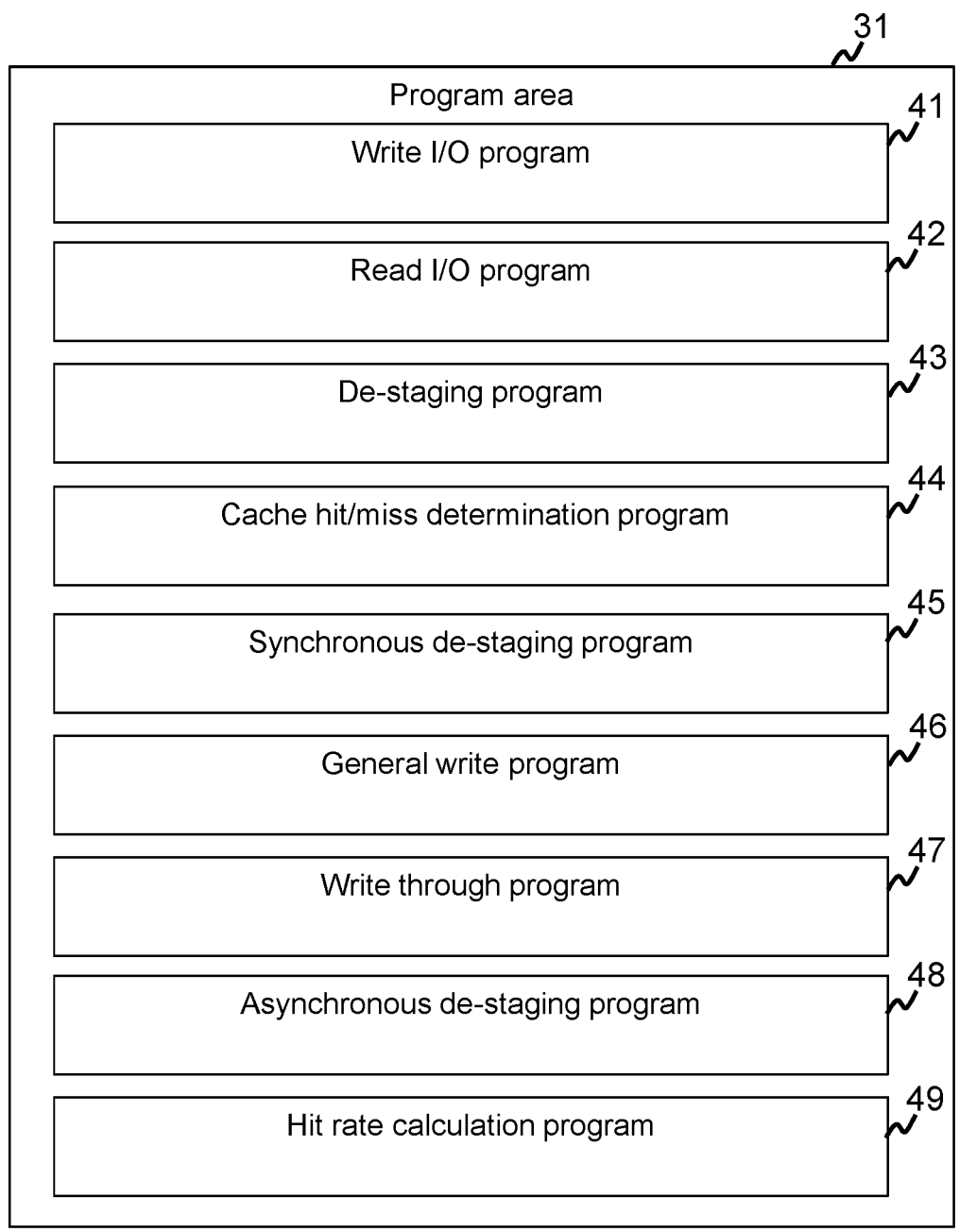
FIG. 4 is a view illustrating a program stored in a program area according to Embodiment 1.

FIG. 4 is a view illustrating the program stored in the program area 31.

The program area 31 stores therein a write I/O program 41, a read I/O program 42, a de-staging program 43, a cache hit/miss determination program 44, a synchronous de-staging program 45, a general write program 46, a write through program 47, an asynchronous de-staging program 48, and a hit rate calculation program 49. Details of each program are described later.

Figure 5:
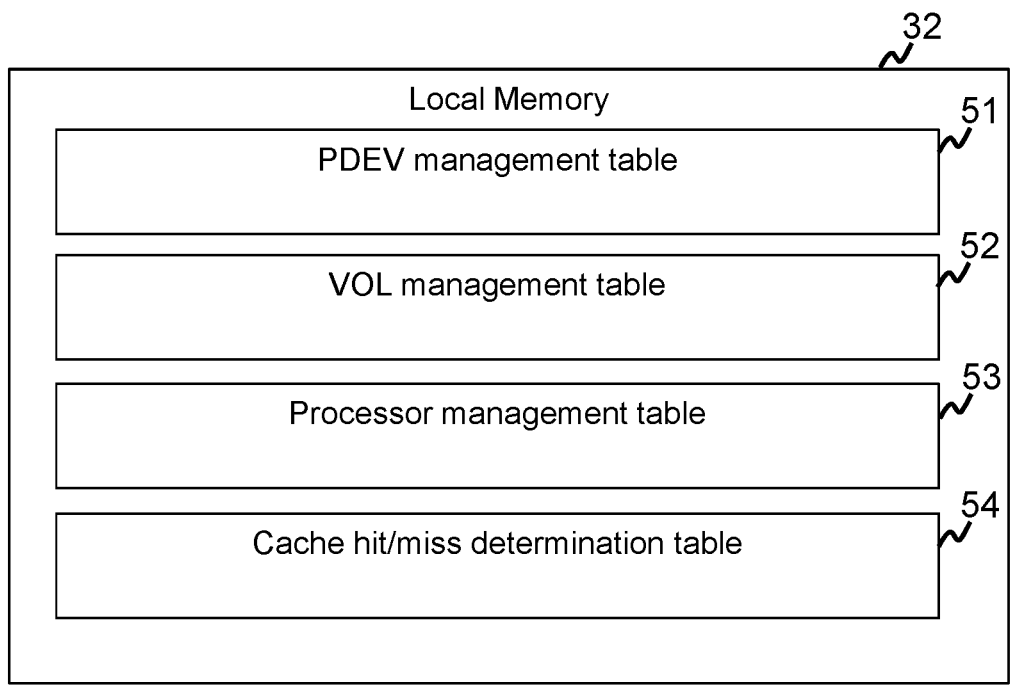
FIG. 5 is a view illustrating information stored in a local memory according to Embodiment 1.

FIG. 5 is a view illustrating the information stored in the local memory 32.

The local memory 32 stores therein a PDEV management table 51, a VOL management table 52, a processor management table 53, and a cache hit/miss determination table 54. Details of each table are described later.

FIG. 6 is a view illustrating an example of the PDEV management table 51.

The PDEV management table 51 is a table holding information on the PDEV, and includes entries for each parity group. The entries include fields of a parity group number 511, a PDEV number 512, a PDEV number 513, a RAID level 514, and a type 515.

The parity group number 511 has the number of the parity group stored therein. The PDEV number 512 has the number of the PDEVs 26 forming the parity group stored therein. The PDEV number 513 has the number of the PDEV 26 forming the parity group stored therein. The RAID level 514 has the RAID level and the configuration (the breakdown (the number of the data and the number of the parities) of the stripe data) of the parity group stored therein. The type 515 has the type of the PDEV 26 forming the parity group stored therein.

FIG. 7 is a view illustrating an example of the VOL management table 52.

The VOL management table 52 is a table holding information on the VOL and includes entries for each VOL. The entries include fields of a VOL number 521, a parity group number 522, a start address 523 in the parity group, a capacity 524, a data hit rate 525, a slot hit rate 526, and a stripe hit rate 527.

The VOL number 521 has the number of the VOL stored therein. The parity group number 522 has the number of the parity group with which the VOL is associated stored therein. The start address 523 in the parity group has a start address in the parity group with which the VOL is associated (a start address of the VOL space in the logical space provided by the parity group) stored therein. The capacity 524 has the capacity of the VOL stored therein.

The data hit rate 525 has the data hit rate of the VOL stored therein. The "data hit rate" is the ratio of the number of block hit write requests (the number of the write requests for which there is a block hit) to the total number of the write requests. The "block hit" means that a block (a block in the VOL) having data that is cached in the cache memory 35 stored therein is found.

The slot hit rate 526 has the slot hit rate of the VOL stored therein. The "slot hit rate" is the ratio of the number of VOL slot hit write requests (the number of the write requests for which there is a VOL slot hit) to the total number of the write requests. The "VOL slot hit" means that a VOL slot including a block having data that is cached in the cache memory 35 stored therein is found.

The stripe hit rate 527 has a stripe hit rate of the VOL stored therein. The "stripe hit rate" is the ratio of the number of stripe hit write requests (the number of write requests for which there is a stripe hit) to the total number of the write requests. The "stripe hit" means that a stripe including a VOL slot including a block having data that is cached in the cache memory 35 stored therein is found.

FIG. 8 is a view illustrating an example of the processor management table 53.

The processor management table 53 is a table holding information on the processor 24 and includes entries for each processor 24. The entries include fields of a processor number 531, an operating rate 532, a cache memory allocation amount 533, a cache usage rate 534, and a dirty cache rate 535.

The processor number 531 has the number of the processor 24 stored therein. The operating rate 532 has the operating rate of the processor 24 stored therein. The cache memory allocation amount 533 has a stored therein. The cache capacity is a capacity of a cache memory area allocated to the processor 24 (the cache memory for the processor). The cache usage rate 534 has a cache usage rate, which is a ratio of the usage capacity (consumption capacity) to the cache capacity, stored therein.

The dirty cache rate 535 has a ratio of a dirty capacity (the total amount of dirty data) to the cache capacity stored therein. The "dirty data" is data that is not stored in the VOL (PDEV 26) yet. By contrast, the "clean data" is data that is stored in the VOL (PDEV 26).

FIG. 9 is a view illustrating an example of the cache hit/miss determination table 54.

The cache hit/miss determination table 54 is a table holding information used to determine whether there is a cache hit or a cache miss and includes entries for each cache slot. The entries include fields of a cache slot address 541, a VOL number 542, an address 543 in the VOL, an attribute 544, a data existence bitmap 545, a dirty bitmap 546, and a lock state 547.

The cache slot address 541 has the address of the cache slot stored therein. The VOL number 542 has the number of the VOL including the VOL slot corresponding to the cache slot stored therein. The address 543 in the VOL has the start address of the VOL slot corresponding to the cache slot stored therein. The attribute 544 has the attribute of the cache slot stored therein. The attribute of the cache slot includes, for example, "dirty", "clean", or "free". When there is at least one dirty data in the cache slot, the attribute of that cache slot is "dirty". When there is no dirty data and at least one clean data in the cache slot, the attribute of that cache slot is "clean". When there is no data in the cache slot, the attribute of that cache slot is "free".

The data existence bitmap 545 has the data existence bitmap stored therein. The data existence bitmap is a bitmap indicating whether there is data in each block in the cache slot. The bit in the data existence bitmap corresponds to the block in the cache slot. When there is data in the block, the bit corresponding to that block is "1". When there is no data in the block, the bit corresponding to that block is "0".

The dirty bitmap 546 has the dirty bitmap stored therein. The dirty bitmap is a bitmap indicating whether the data in each block in the cache slot is dirty data. The bit in the dirty bitmap corresponds to the block in the cache slot. When the data in the block is dirty data, the bit corresponding to that block is "1". When the data in the block is not dirty data (or when there is no data in the block), the bit corresponding to that block is "0". A clean bitmap indicating whether the data in the block is clean data may be employed instead of the dirty bitmap.

The lock state 547 has information indicating the lock state of the cache slot stored therein. As the lock state, for example, one of "exclusive", "shared", and "released" is stored. The "exclusive" means that locking has been performed. The "shared" means that locking/releasing is unnecessary. The "released" means that locking has been not performed.

In this embodiment, the cache hit/miss determination table 54 may include entries for each buffer area. The buffer area may be the same size as the slot, may have be smaller in size than the slot, or may be larger in size than the slot. In the entries corresponding to the buffer area, the number of the VOL corresponding to the buffer area may be stored in the VOL number 542, the start address of the VOL slot corresponding to the buffer area may be stored in the address 543 in the VOL, the lock state of the buffer area such as exclusive, shared, or the like may be stored in the lock state 547, and values may not be configured in fields other than those fields. Exclusive control of the data in the data buffer 34 is possible due to those entries corresponding to the buffer area. The entries corresponding to the buffer area may be provided to another table instead of the cache hit/miss determination table 54.

The attributes of the cache slot (and the buffer area) or the data in the cache slot may be managed on the basis of information on a different type of structure instead of the bitmap.

Next, processing performed in Embodiment 1 is described.

Figure 10:
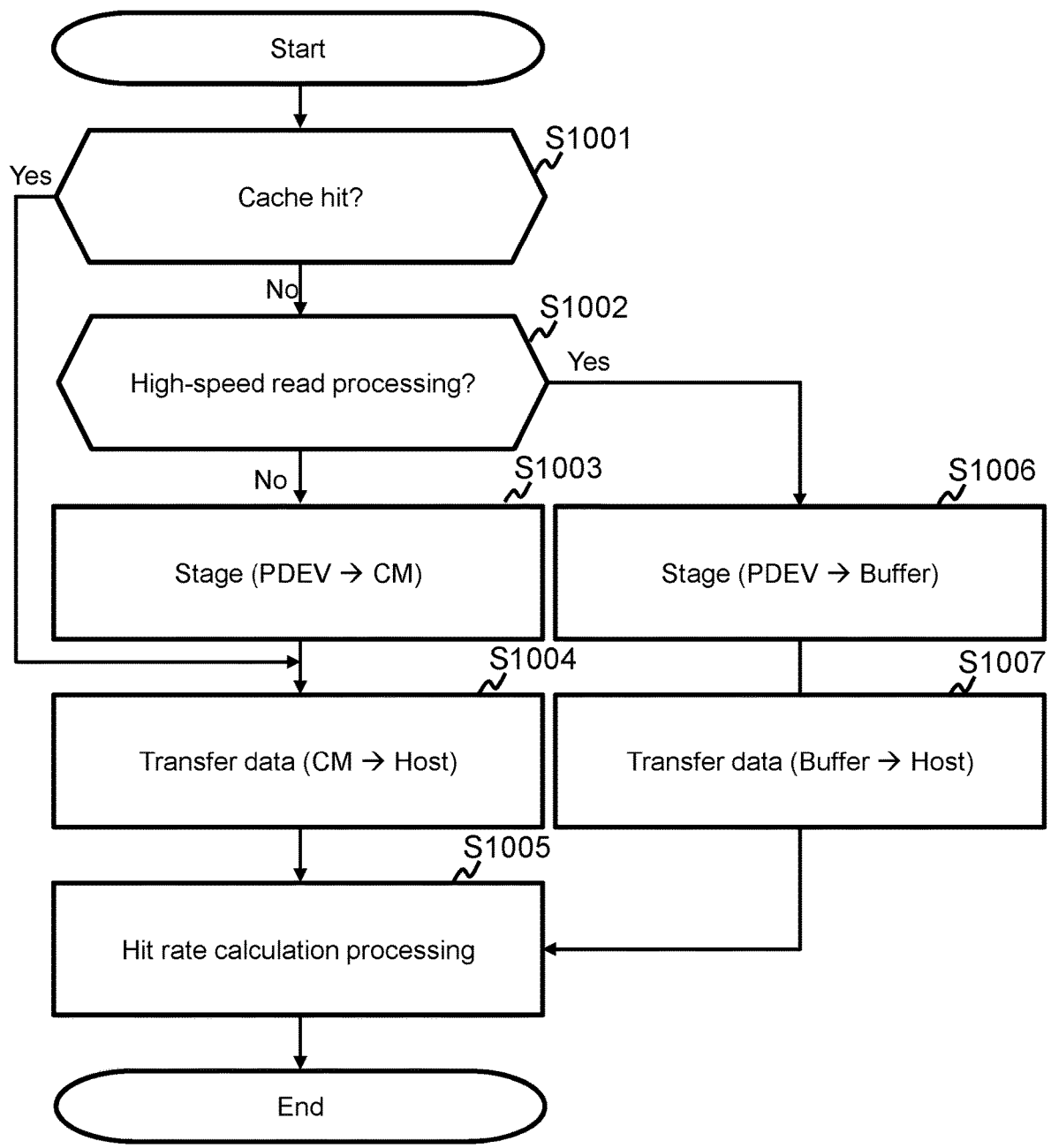
FIG. 10 is a flowchart of read processing according to Embodiment 1.

FIG. 10 is a flowchart of read processing.

The read processing is started when the storage system 20 receives the read request from the host 10.

The read I/O program 42 executes the cache hit/miss determination program 44. The cache hit/miss determination program 44 determines whether read target data in accordance with the received read request is a cache hit, that is, determines whether the read target data exists in the cache memory 35 (S1001). The cache hit/miss determination program 44 returns the determination result to the read I/O program 42. When all the read target data exists in the cache memory 35, it is determined that there is a cache hit, and when at least part of the read target data does not exist in the cache memory 35, it is determined that there is a cache miss. When the determination result of Step S1001 is positive (cache hit) (S1001: Yes), the processing proceeds to Step S1004.

When the determination result of Step S1001 is negative (cache miss) (S1001: No), on the other hand, the read I/O program 42 determines whether this read processing is high-speed read processing (S1002). The read processing is high-speed read processing means that, for example, the processor operating rate is high and the cache hit rate is low, in other words, the read range is wide and dispersed read is performed. When the determination result of Step S1002 is negative (S1002: No), the read I/O program 42 reads the read target data (data that does not exist in the cache memory 35 among the read target data) from the PDEV 26 to the cache memory 35 (S1003).

In Step S1004, the read I/O program 42 transfers the data cached in the cache memory 35 to the host 10.

When the determination result of Step S1002 is positive (S1002: Yes), on the other hand, even if the data is cached in the cache memory 35, there is a low possibility that the data may be read again. Thus, the read I/O program 42 reads the read target data from the PDEV 26 to the data buffer 34 (S1006), and transfers the data, which is read out to the data buffer 34, to the host 10 (S1007).

In Step S1005, the read I/O program 42 executes the hit rate calculation program 49. The hit rate calculation program 49 executes hit rate calculation processing (not shown) of calculating the hit rate of the read.

This embodiment includes a hit rate for the read (the data hit rate, the slot hit rate, and the stripe hit rate described above are for the write) and the hit rate for the read is updated in Step S1005. The hit rate for read and the hit rate for write may be identical.

When the determination result of Step S1002 is positive (S1002: Yes), the data is not cached in the cache memory 35, but the data may be cached in the cache memory 35 by following predetermined regulations (for example, once every predetermined number of times) instead.

Figure 11:
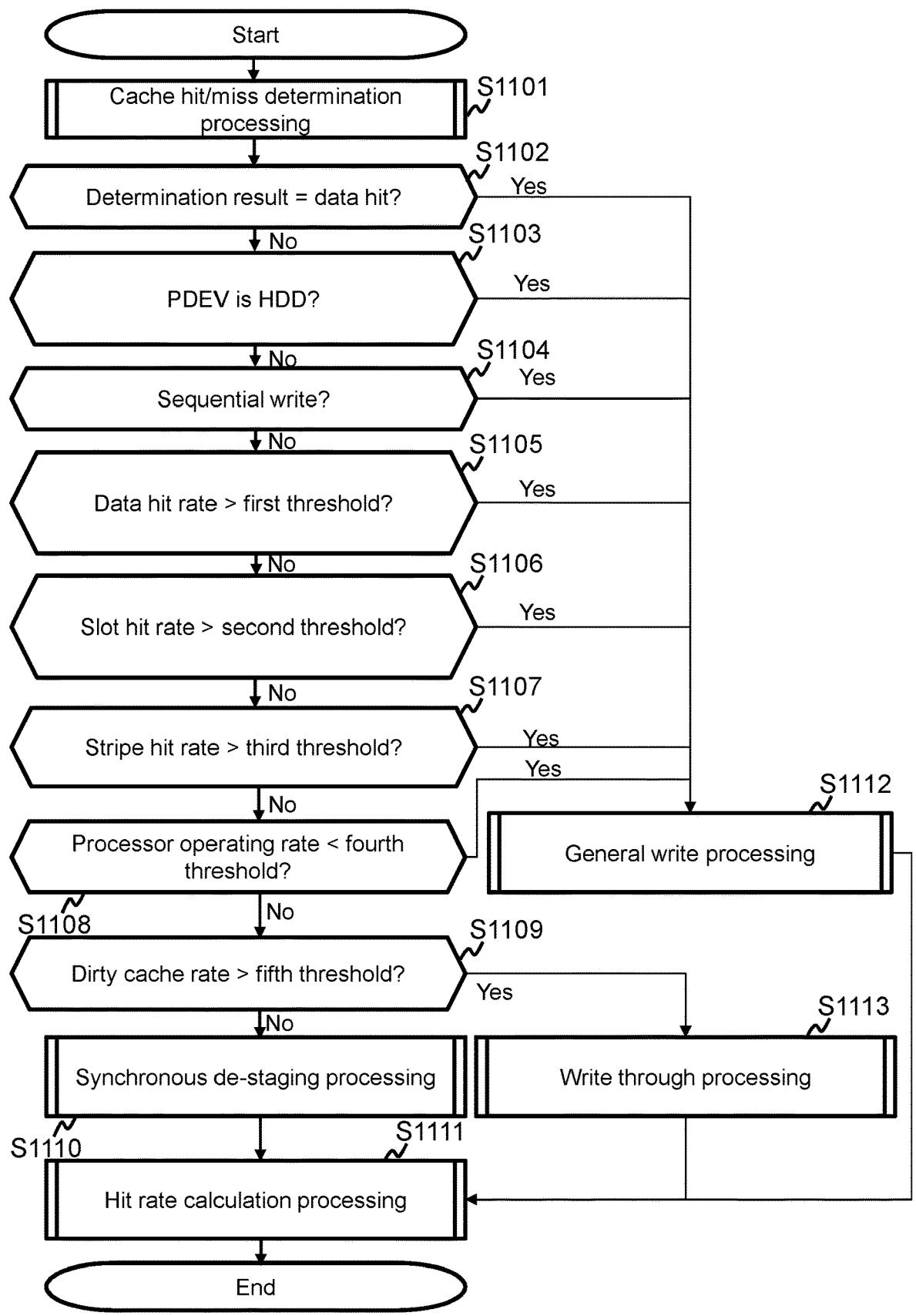
FIG. 11 is a flowchart of write processing according to Embodiment 1.

FIG. 11 is a flowchart of write processing.

The write processing is processing that is started when the storage system 20 receives the write request from the host 10. A first threshold to a fifth threshold described later that may be used in the write processing may be stored in the memory 22 (for example, the shared memory 33 or the local memory 32).

The write I/O program 41 executes the cache hit/miss determination program 44. The cache hit/miss determination program 44 executes cache hit/miss determination processing (see FIG. 12) of the write target data in accordance with the received write request (S1101). The cache hit/miss determination program 44 returns the determination result to the write I/O program 41. The cache hit/miss determination processing may be performed on the basis of the address specified in the write request and the cache hit/miss determination table 54, and the write target data itself is not necessary.

When the determination result of the cache hit/miss determination processing is a data hit (S1102: Yes), the data cached in the cache memory 35 needs to be rewritten. Thus, the write I/O program 41 causes the processing to proceed to Step S1112.

When the determination result of the cache hit/miss determination processing is not a data hit (S1102: No), on the other hand, the write I/O program 41 refers to the VOL management table 52 and the PDEV management table 51, and determines whether the PDEV type corresponding to the parity group associated with a write destination VOL is an HDD (S1103). The HDD is an example of a PDEV that requires a seek operation.

When the determination result of Step S1103 is positive (S1103: Yes), the processing efficiency can be expected to increase by asynchronous de-staging processing. Specifically, in the asynchronous de-staging processing, for example, data may be written to the HDD by sorting the order of the data in an order that reduces the seek time by the HDD. As a result, the write I/O program 41 may cause the processing to proceed to Step S1112.

When the determination result of Step S1103 is negative (S1103: No), on the other hand, the write I/O program 41 determines whether the write in accordance with the write request is a sequential write (S1104). Determining whether the write is the sequential write may be performed by determining whether the plurality of addresses specified by the plurality of write requests that are received continuously are continuous.

When the determination result of Step S1104 is positive (S1104: Yes), the processing efficiency can be expected to increase by the asynchronous de-staging processing. Specifically, for example, when the write is the sequential write, execution of general write processing (S1112) causes the data to be sequentially cached. As a result, the processing amount of de-staging (data storage from the cache memory 35 to the PDEV 26) may be reduced. For example, the de-staging may be performed by generating the parity by using only the data of the cache memory 35 (in other words, by generating the parity without reading the data from the PDEV 26). Thus, when the determination result of Step S1104 is positive, the write I/O program 41 may cause the processing to proceed to Step S1112.

When the determination result of Step S1104 is negative (S1104: No), on the other hand, the write I/O program 41 refers to the VOL management table 52 and determines whether the data hit rate corresponding to the write destination VOL is higher than the first threshold (the threshold for the data hit rate) (S1105).

When the determination result of Step S1105 is positive (S1105: Yes), the effect of the asynchronous de-staging processing can be expected. For example, when the data hit rate is higher than the first threshold, there is a high possibility that a write to the same block may occur in the subsequent write requests. Thus, the number of times of the de-staging may be reduced by storing the data in the cache memory 35 and performing the asynchronous de-staging processing. Thus, when the determination result of Step S1105 is positive, the write I/O program 41 causes the processing to proceed to Step S1112.

When the determination result of Step S1105 is negative (S1105: No), on the other hand, the write I/O program 41 refers to the VOL management table 52 and determines whether the slot hit rate corresponding to the write destination VOL is higher than the second threshold (the threshold for the slot hit rate) (S1106).

When the determination result of Step S1106 is positive (S1106: Yes), the effect of the asynchronous de-staging processing can be expected. Specifically, for example, when the slot hit rate is higher than the second threshold, there is a high possibility that write may occur for the same VOL slot thereafter. This means that there is a high possibility that the data will be stored in a separated storage area (block) in the same cache slot. In that case, continuous data in the same cache slot may be de-staged by reading the data from the PDEV 26 to a gap area of the cache slot (for example, a free block between blocks having data stored therein). As a result, the number of times the PDEV 26 is accessed in the de-staging may be reduced. Thus, when the determination result of Step S1106 is positive, the write I/O program 41 causes the processing to proceed to Step S1112.

When the determination result of Step S1106 is negative (S1106: No), on the other hand, the write I/O program 41 refers to the VOL management table 52 and determines whether the stripe hit rate of the write destination VOL is higher than the third threshold (the threshold for the stripe hit rate) (S1107).

When the determination result of Step S1107 is positive (S1107: Yes), the effect of the asynchronous de-staging can be expected. Specifically, for example, when the stripe hit rate is higher than the third threshold, there is a high possibility that writing for the same stripe may occur thereafter. This means that there is a high possibility that data of which write destination is the VOL slot in the same stripe is stored in the cache memory 35. In that case, in the asynchronous de-staging processing, the parity may be generated by using only the data in the cache memory 35 (or by reading the data from the PDEV 26 by a fewer number of times). Thus, when the determination result of Step S1107 is positive, the write I/O program 41 causes the processing to proceed to Step S1112.

When the determination result of Step S1107 is negative (S1107: No), on the other hand, the write I/O program 41 refers to the processor management table 53 and determines whether the operating rate of the processor 24 that executes the write request is lower than the fourth threshold (the threshold for the processor operating rate) (S1108).

When the determination result of Step S1108 is positive (S1108: Yes), it means that the operating rate of the processor 24 (an example of a load) is already low. Thus, the need to lower the processor operating rate by the synchronous de-staging processing (S1110) or the write through processing is low (S1113). Thus, the write I/O program 41 causes the processing to proceed to Step S1112.

When the determination result of Step S1108 is negative (S1108: No), on the other hand, the write I/O program 41 performs the de-staging in synchronization with the write request (that is, as part of processing of the write processing performed in response to the write request) in the processing of Step S1109 and thereafter in order to lower the operating rate of the processor 24.

In Step S1109, the write I/O program 41 refers to the processor management table 53 and determines whether the dirty cache rate of the processor 24 executing the write request is higher than the fifth threshold (the threshold for the dirty cache rate).

When the determination result of Step S1109 is negative (S1109: No), the write I/O program 41 executes the synchronous de-staging program 45 and the synchronous de-staging program 45 executes the synchronous de-staging processing (see FIG. 13) (S1110).

When the determination result of Step S1109 is positive (S1109: Yes), on the other hand, the write I/O program 41 executes the write through program 47 and the write through program 47 executes the write through processing (see FIG. 17) (S1113). An example of a reason for performing the write through processing when the determination result of Step S1109 is positive is as following. That is, in the write through processing, a lower load is placed on the processor 24 as compared to the synchronous de-staging processing, but the response to the host 10 (the response to the write request) is slower. When the dirty cache rate is higher than the fifth threshold, the storage system 20 executes an entrance restriction for keeping the write request from the host 10 waiting. As a result, the response to the host 10 is slow for both the write through processing and the synchronous de-staging processing. Thus, the throughput is increased when the write through processing is performed because the load placed on the processor 24 is reduced.

Figure 18:
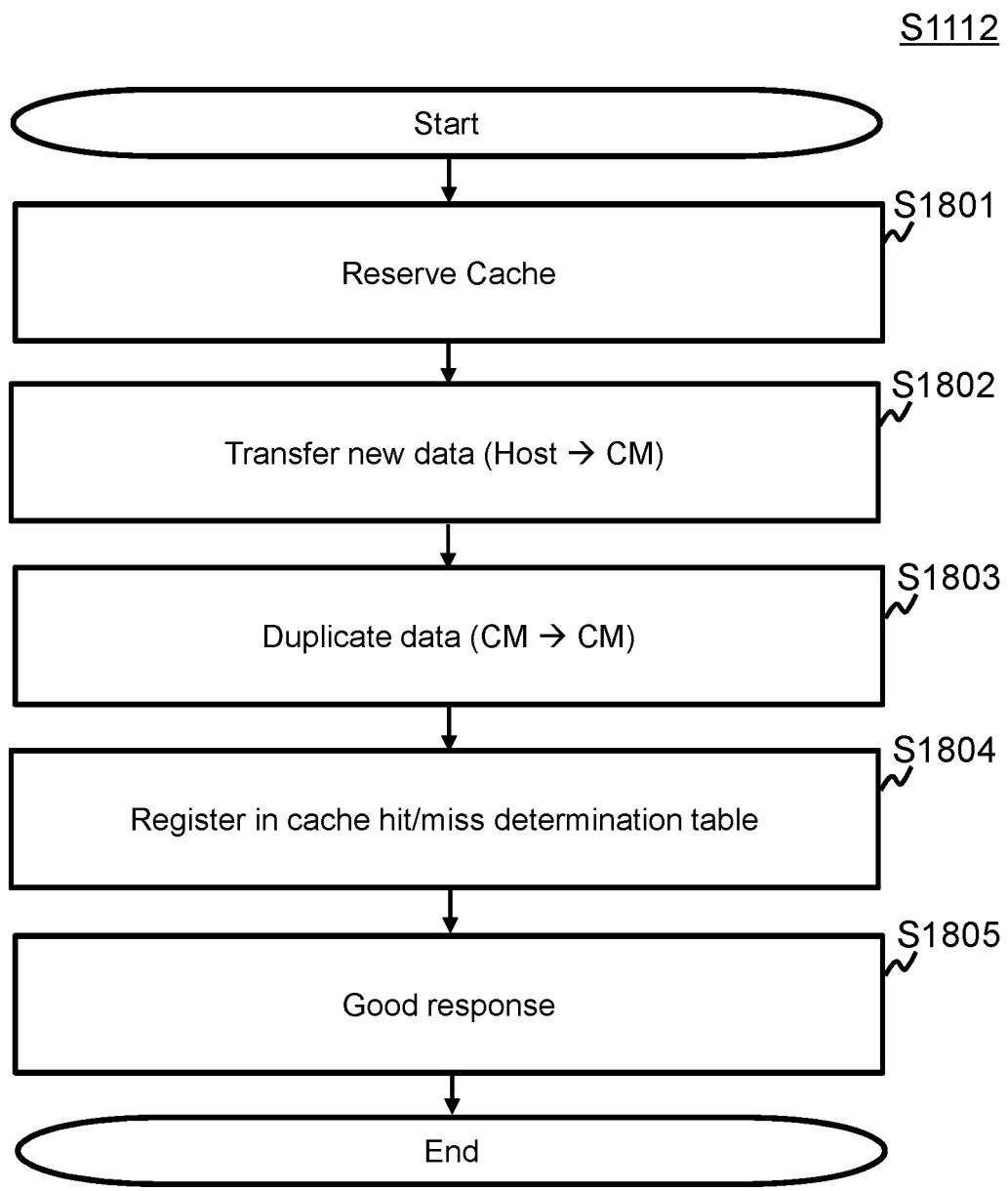
FIG. 18 is a flowchart of general write processing according to Embodiment 1.

In Step S1112, the write I/O program 41 executes the general write program 46 and the general write program 46 executes the general write processing (see FIG. 18). In the general write processing, the write target data is stored in the cache memory 35, but the de-staging of the write target data stored in the cache memory 35 is not performed. The data cached in the general write processing is de-staged by the asynchronous de-staging processing executed asynchronously to the receiving of the write request (that is, executed as processing different from the write processing performed in response to the write request) (see FIG. 20).

After the synchronous de-staging processing (S1110), the write through processing (S1113), or the general write processing (S1112), the write I/O program 41 executes the hit rate calculation program 49. The hit rate calculation program 49 executes the hit rate calculation processing of calculating the hit rate of the writing (see FIG. 20).

As described above, according to the write processing illustrated in FIG. 11, it is determined whether the processing efficiency is expected to increase by the asynchronous de-staging processing. The determination conditions are as described in the examples of Step S1103 to Step S1108, but are typically conditions by which the throughput performance of the random write is expected to increase. When the determination result is positive, the asynchronous de-staging processing is selected. When the determination result is negative, the synchronous de-staging processing or the write through processing is selected instead of the asynchronous de-staging processing. The determination conditions are not limited to the conditions exemplified in Step S1103 to Step S1108. Only a part of those conditions may be used, or another condition may be employed instead of or in addition to at least one condition of those conditions. The order of priorities of the determination conditions (determination order) may not be limited to the order of Step S1103 to Step S1108. For example, Step S1103, Step S1108, and Step S1109 may not be performed each time the write request is received, but may be performed together. When the processing efficiency is not expected to increase by the asynchronous de-staging processing, the synchronous de-staging processing or the write through processing may be always executed instead of selecting one of the synchronous de-staging processing and the write through processing. The synchronous de-staging processing and the write through processing are each an example of synchronous storage processing. The synchronous storage processing is processing of storing the write target data in the parity group (PDEV) in the write processing performed in response to the write request.

Figure 12:
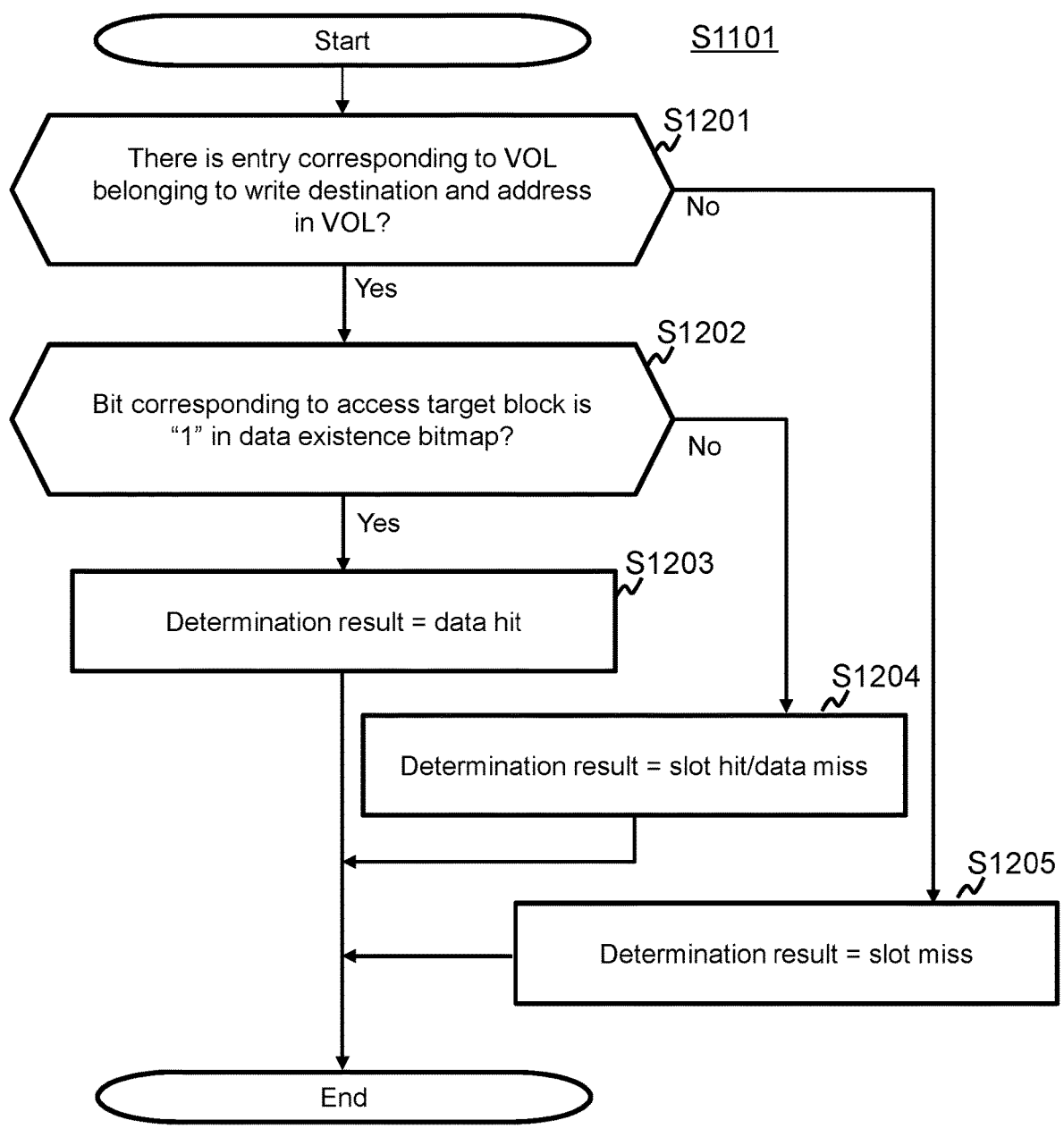
FIG. 12 is a flowchart of cache hit/miss determination processing according to Embodiment 1.

FIG. 12 is a flowchart of the cache hit/miss determination processing (S1101).

The cache hit/miss determination program 44 refers to the cache hit/miss determination table 54 and determines whether there is an entry corresponding to the VOL belonging to the write destination and the address in the VOL (S1201). When the determination result of Step S1201 is negative (S1201: No), the cache hit/miss determination program 44 outputs a slot miss as the determination result (S1205). The slot miss the means no cache slot that corresponds to the VOL slot belonging to the write destination in accordance with the write request exists in the cache memory 35.

When the determination result of Step S1201 is positive (S1201: Yes), on the other hand, the cache hit/miss determination program 44 determines whether the bit corresponding to the write destination block is "1" in the data existence bitmap of the entry (S1202).

When the determination result of Step S1202 is positive (S1202: Yes), on the other hand, the cache hit/miss determination program 44 outputs the data hit as the determination result (S1203). When the determination result of Step S1202 is negative (S1202: No), the cache hit/miss determination program 44 outputs a slot hit/data miss as the determination result. The slot hit/data miss means that the cache slot corresponding to the VOL slot belonging to the write destination exists in the cache memory 35, but no data exists in the write destination block in the write destination VOL.

Figure 13:
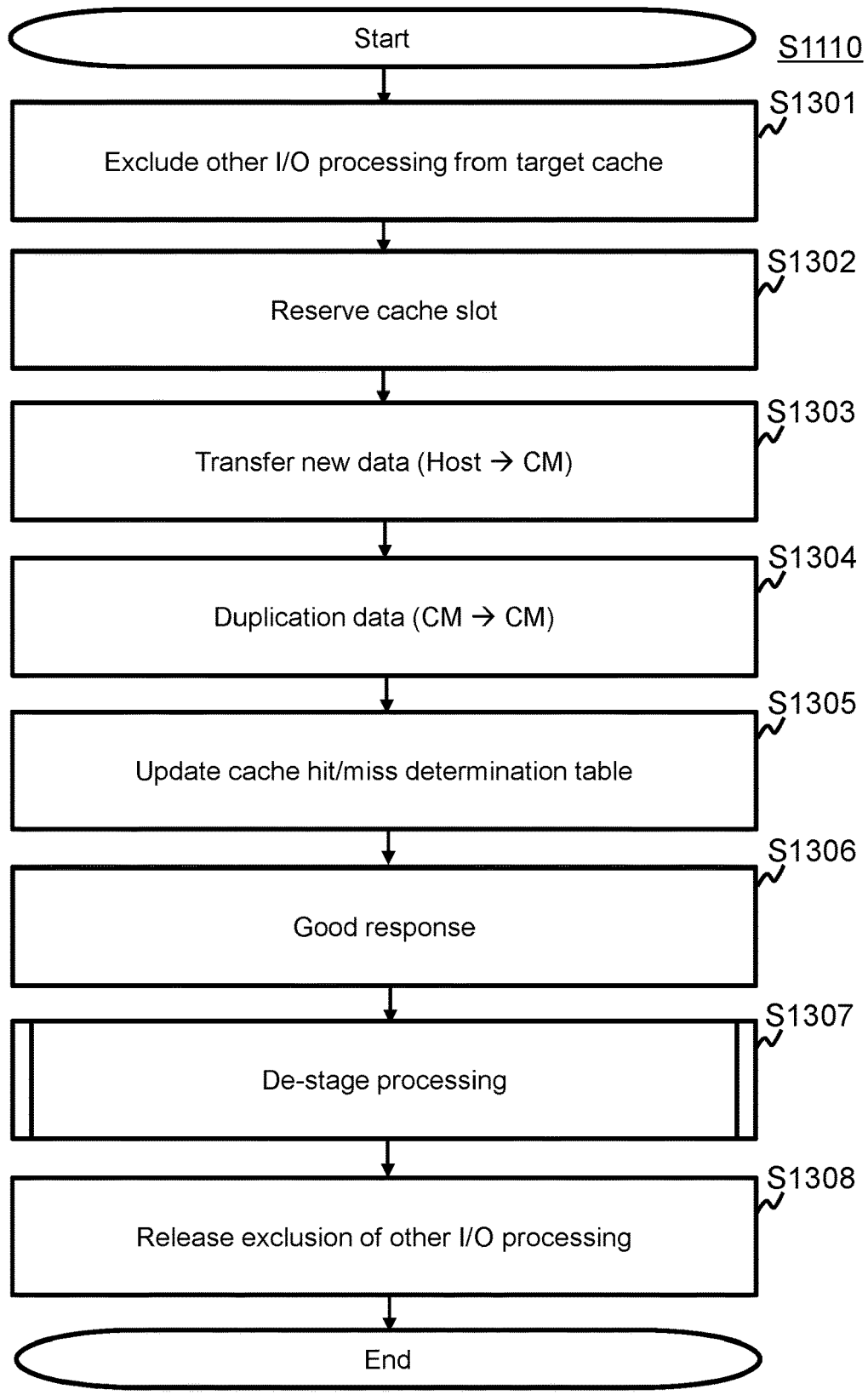
FIG. 13 is an example of a flowchart of synchronous de-staging processing according to Embodiment 1.

FIG. 13 is an example of a flowchart of the synchronous de-staging processing (S1110).

The synchronous de-staging program 45 reserves the cache slot serving as the write destination of the write target data so that the cache slot is in a state exclusive of other I/O processing (S1301 and S1302). Specifically, the synchronous de-staging program 45 refers to the cache hit/miss determination table 54 and determines the entry corresponding to the cache slot serving as the write destination, to thereby configure the lock state of that entry as "exclusive". The entry that is determined here is referred to as a "target entry" in the description of FIG. 13. The synchronous de-staging program 45 selects the entry of a usable slot when there is no entry corresponding to the write-destination cache slot in the cache hit/miss determination table 54. In that case, the selected entry is the "target entry".

Next, the synchronous de-staging program 45 receives the write target data (new data) in accordance with the write request from the host 10, and stores the new data in the reserved cache slot (S1303). Next, the synchronous de-staging program 45 copies the new data from the cache slot to the cache memory 35 in a different controller (S1304). That is, duplication of the new data is performed.

Next, the synchronous de-staging program 45 registers information corresponding to the new data to the target entry (S1305). For example, the synchronous de-staging program 45 updates a bit corresponding to a free block of the cache slot that corresponds to the target entry and corresponding to a block having the new data written thereto (a bit in the data existence bitmap) from "0" to "1".

Next, the synchronous de-staging program 45 returns a Good response indicating that the processing of the write request has ended normally as a response to the host 10 (S1306).

Next, the synchronous de-staging program 45 executes the de-staging program 43 and the de-staging program 43 executes the de-staging processing (FIG. 15) (S1307). The de-staging processing is performed by at least one of two controllers configured to store duplicated data.

After the de-staging processing is ended, the synchronous de-staging program 45 releases the exclusive state of the cache slot corresponding to the target entry (S1308). Specifically, the lock state of the target entry is updated from "exclusive" to "released".

Figure 14:
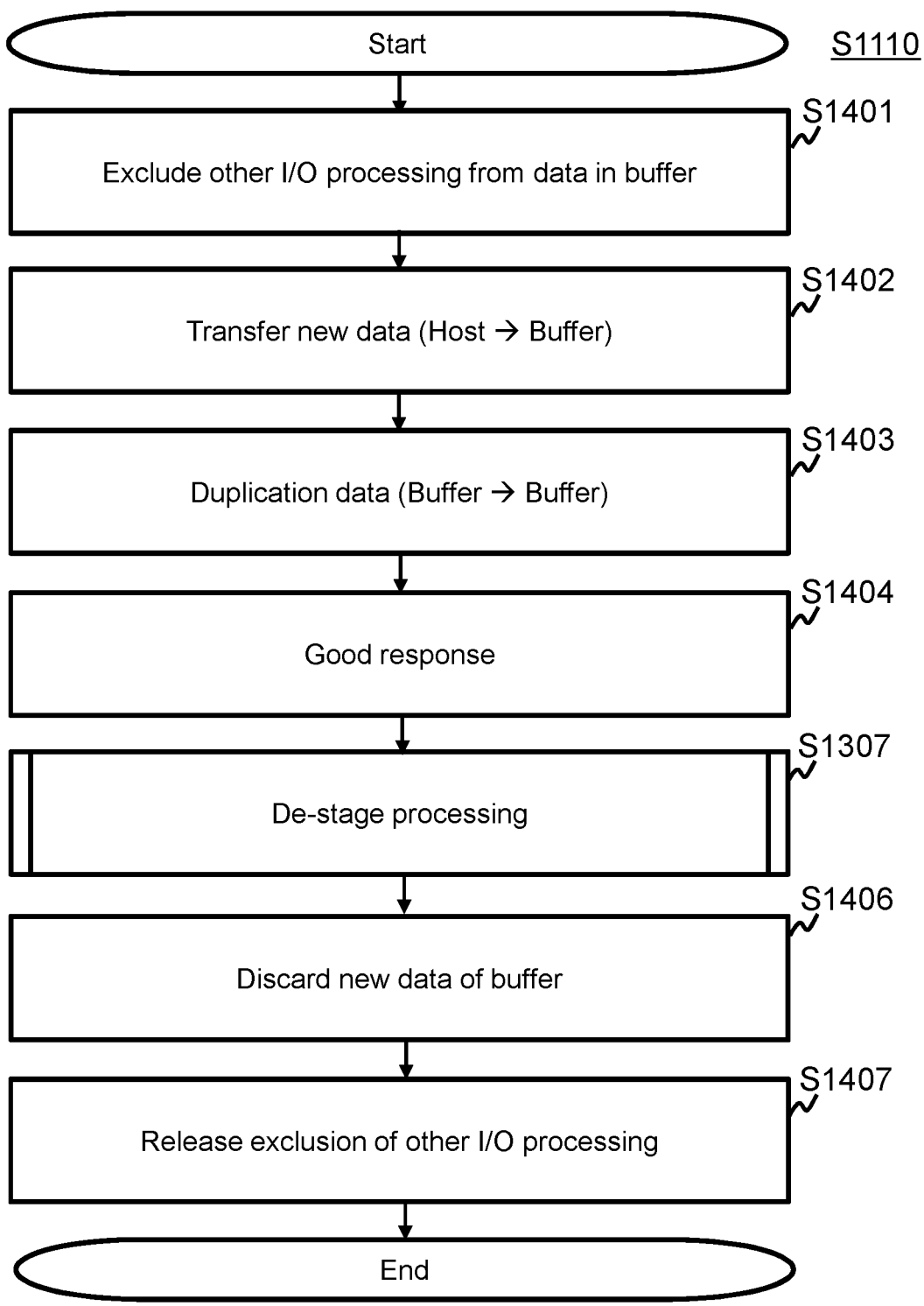
FIG. 14 is another example of a flowchart of the synchronous de-staging processing according to Embodiment 1.

FIG. 14 is another example of a flowchart of the synchronous de-staging processing (S1110).

The synchronous de-staging processing illustrated in FIG. 14 may be employed instead of the synchronous de-staging processing illustrated in FIG. 13. In this synchronous de-staging processing, the synchronous de-staging program 45 reserves the buffer area serving as the write destination of the write target data in the data buffer 34 and turns the state of the buffer area into the state exclusive of other I/O processing. In this embodiment, the synchronous de-staging program 45 adds the entry corresponding to the reserved buffer area to the cache hit/miss determination table 54 and registers the number of the write destination VOL, the address in the write destination VOL, and the lock state "exclusive" to that entry.

Next, the synchronous de-staging program 45 receives the write target data (new data) in accordance with the write request from the host 10 and stores the new data in the reserved buffer area (S1402). Next, the synchronous de-staging program 45 copies the new data from that buffer area to the data buffer 34 in another controller 21 (S1403).

Next, the synchronous de-staging program 45 returns the Good response indicating that the processing of the write request has ended normally as a response to the host 10 (S1404).

Next, the synchronous de-staging program 45 executes the de-staging program 43 and the de-staging program 43 executes the de-staging processing (FIG. 15) (S1307). The de-staging processing is performed by at least one of the two controllers configured to store the duplicated data.

After the de-staging processing is ended, the synchronous de-staging program 45 discards the data in the buffer area (S1406). Next, the synchronous de-staging program 45 releases the state exclusive of the I/O processing in the cache hit/miss determination table 54 by deleting the entry corresponding to the reserved buffer area from the cache hit/miss determination table 54 (S1407).

According to the synchronous de-staging processing illustrated in FIG. 14, because the new data only needs to be temporarily managed in the data buffer 34, there is no need to update cache management information elements (for example, a pointer queue corresponding to dirty, clean, or free) needed when the new data is stored in the cache memory 35 as the cache. As a result, the overhead may be reduced.

Figure 15:
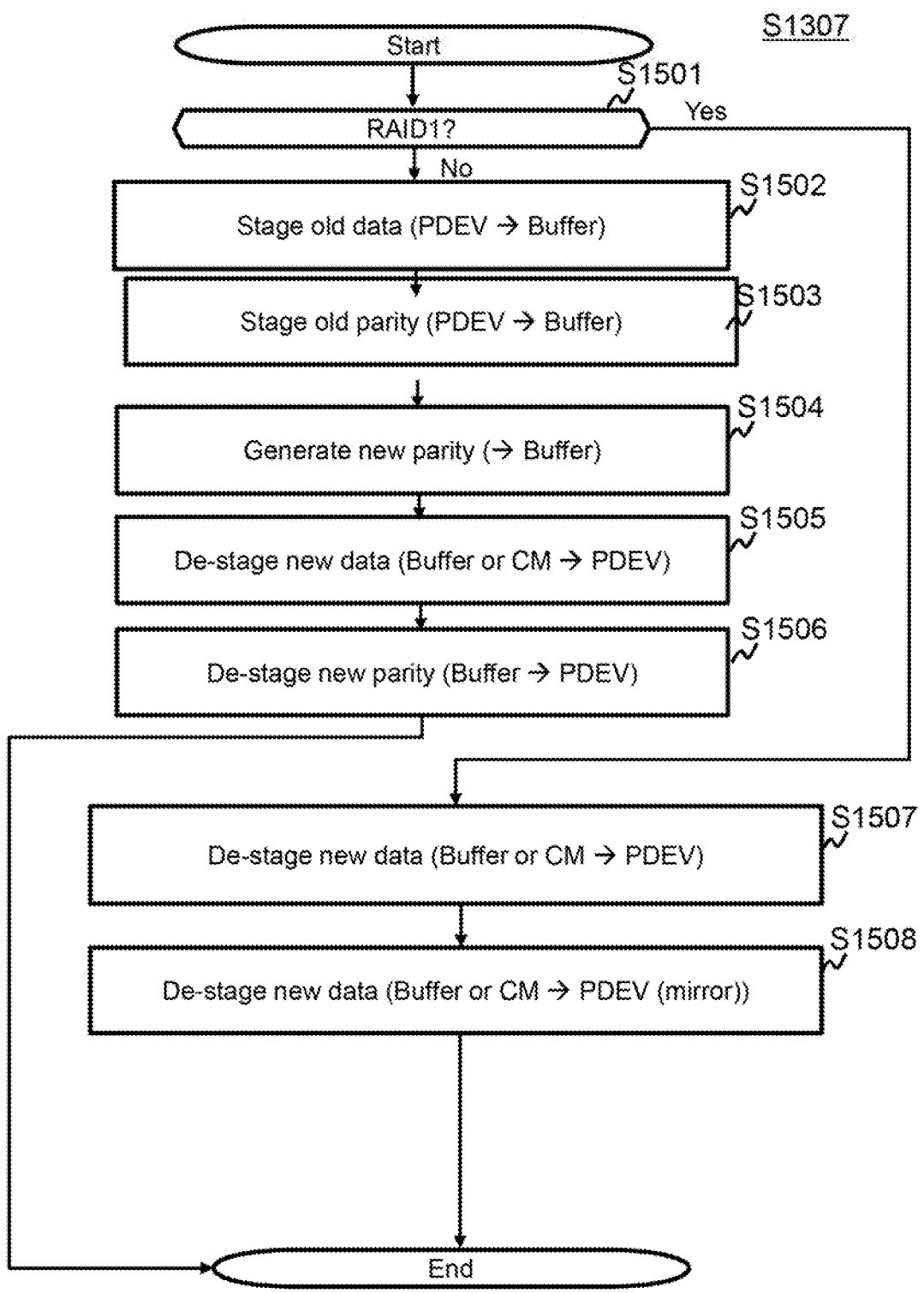
FIG. 15 is an example of a flowchart of de-staging processing according to Embodiment 1.

FIG. 15 is an example of a flowchart of the de-staging processing (S1307).

The de-staging program 43 determines whether the RAID level of the parity group with which the write destination VOL is associated is RAID1 (S1501).

When the determination result of Step S1501 is positive (S1501: Yes), the de-staging program 43 de-stages the new data stored in the cache memory 35 or the data buffer 34 to the PDEV 26 (S1507) and de-stages the new data stored in the cache memory 35 or the data buffer 34 to the PDEV 26 on the mirror side of the RAID1 (S1508).

When the determination result of S1501 is negative (S1501: No), on the other hand, the de-staging program 43 reads the old data and the old parity needed to generate the parity corresponding to the write destination stripe of the new data from the parity group to the data buffer 34 (S1502 and S1503).

Next, the de-staging program 43 generates a new parity with use of the old data and the old parity read out to the data buffer 34 and the new data and stores that new parity in the data buffer 34 (S1504).

Next, the de-staging program 43 de-stages the new data stored in the cache memory 35 or the data buffer 34 to the PDEV 26 (S1505) and de-stages the new parity stored in the data buffer 34 to the PDEV 26 (S1506).

Figure 16:
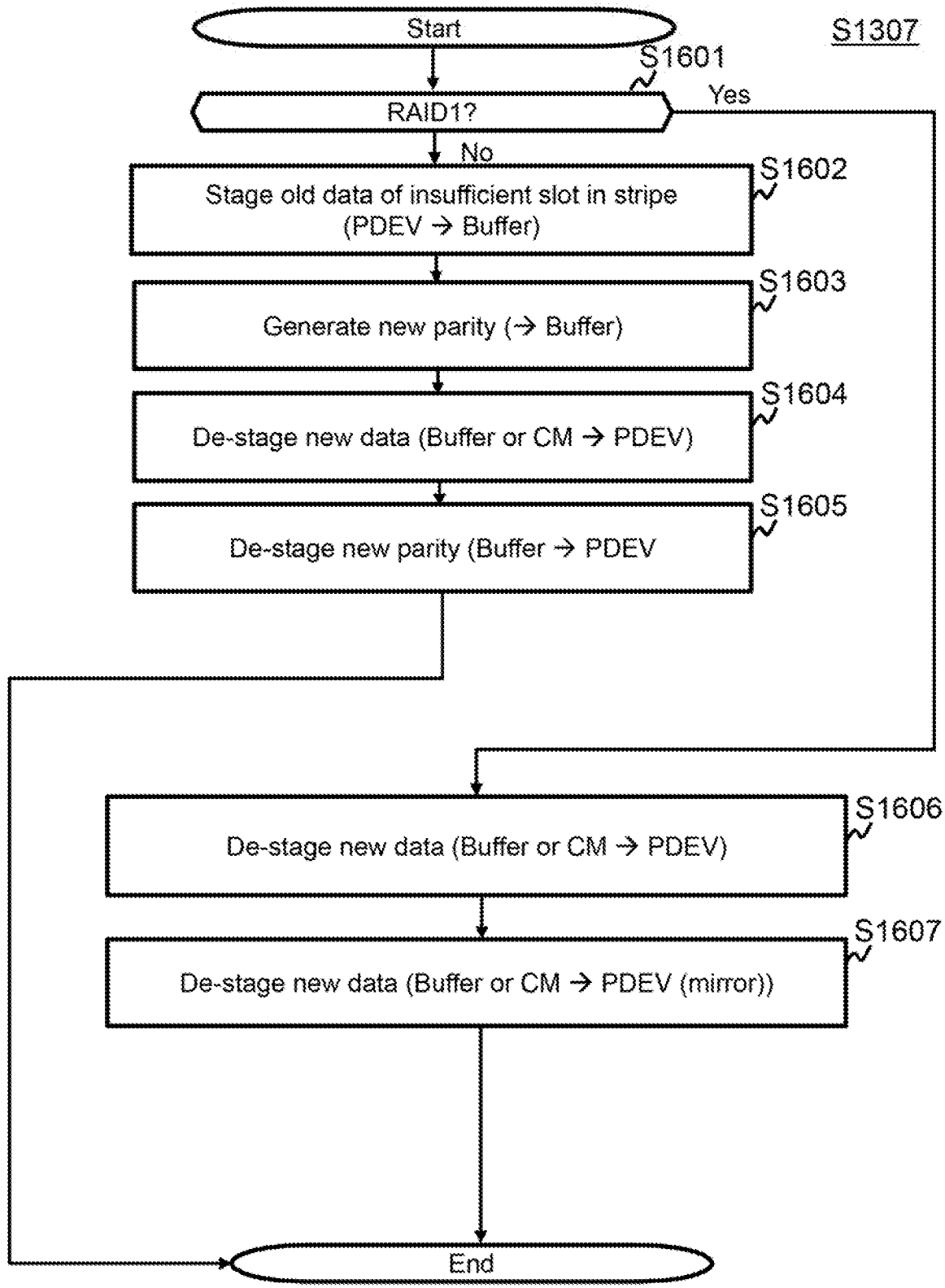
FIG. 16 is another example of a flowchart of the de-staging processing according to Embodiment 1.

FIG. 16 is another example of a flowchart of the de-staging processing (S1307).

The de-staging processing illustrated in FIG. 16 may be employed instead of the de-staging processing illustrated in FIG. 15. In the de-staging processing, the de-staging program 43 determines whether the RAID level of the parity group with which the write destination VOL is associated is RAID1 (S1601).

When the determination result of Step S1601 is positive (S1601: Yes), processing similar to that in Step S1507 and Step S1508 described above is performed (S1606 and S1607).

When the determination result of S1601 is negative (S1601: No), on the other hand, the de-staging program 43 reads (stages) from the PDEV 26 to the data buffer 34 the old data in an area (slot) insufficient for generating a new parity corresponding to the write destination stripe of the new data (S1602).

Next, the de-staging program 43 generates a new parity with use of the old data read out to the data buffer 34 and the new data and stores the new parity in the data buffer 34 (S1603).

Next, the de-staging program 43 de-stages the new data stored in the cache memory 35 or the data buffer 34 to the PDEV 26 (S1604). The de-staging program 43 de-stages the new parity stored in the data buffer 34 to the PDEV 26 (S1605).

The de-staging processing illustrated in FIG. 15 and the de-staging processing illustrated in FIG. 16 may be selectively executed in response to the amount of data read from the PDEV 26 in order to generate a new parity.

Figure 17:
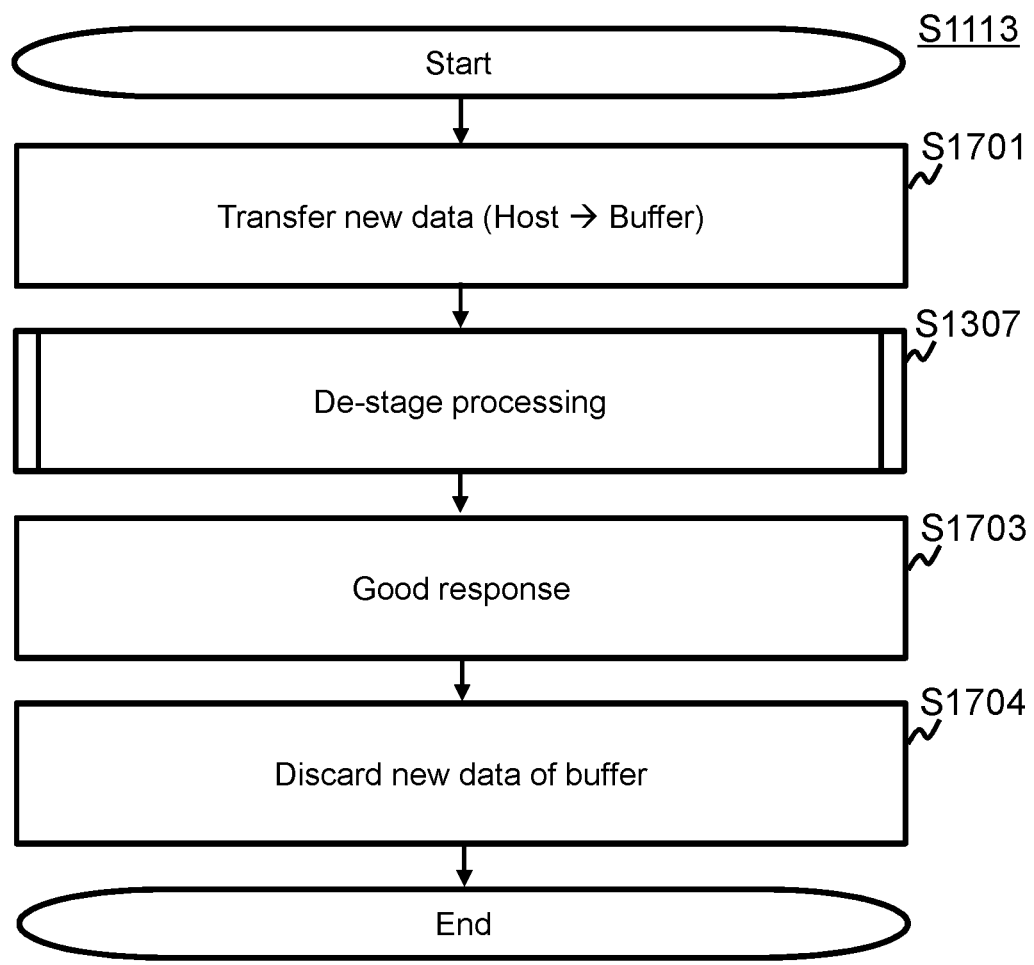
FIG. 17 is a flowchart of write through processing according to Embodiment 1.

FIG. 17 is a flowchart of the write through processing (S1113).

The write through program 47 receives new data from the host 10 and stores that new data in the data buffer 34 (S1701). Next, the write through program 47 executes the de-staging program 43 and the de-staging program 43 executes the de-staging processing (FIG. 15) (S1307). After the de-staging processing is ended, the write through program 47 returns a Good response indicating that the processing of the write request has ended normally as a response to the host 10 (S1703). Next, the write through program 47 discards the new data stored in the data buffer 34 (S1704).

According to the write through processing, as the synchronous de-staging processing illustrated in FIG. 13, the duplication of the new data is unnecessary (S1304). The load placed on the processor 24 may be reduced due to this, for example. According to the write through processing, although the duplication of the data is not performed, reliability is obtained because the Good response is returned to the host 10 after the new data is written to the PDEV 26.

FIG. 18 is a flowchart of the general write processing (S1112).

The general write program 46 reserves the cache slot serving as the write destination of the new data in the cache memory 35 (S1801). Next, the general write program 46 receives the new data from the host 10 and stores that new data in the reserved cache slot (S1802). Next, the general write program 46 copies the new data from that cache slot to the cache memory 35 in another controller 21 (S1803).

Next, the general write program 46 refers to the cache hit/miss determination table 54 and registers the information corresponding to the new data to the entry corresponding to the reserved cache slot (S1804). Next, the general write program 46 returns a Good response indicating that the processing of the write request has normally ended to the host 10 (S1805).

In this general write processing, the data stored in the cache memory 35 is de-staged from the cache memory 35 to the PDEV 26 by the asynchronous de-staging processing described later (see FIG. 20) at a timing asynchronous to the write request of the host 10.

Figure 19:
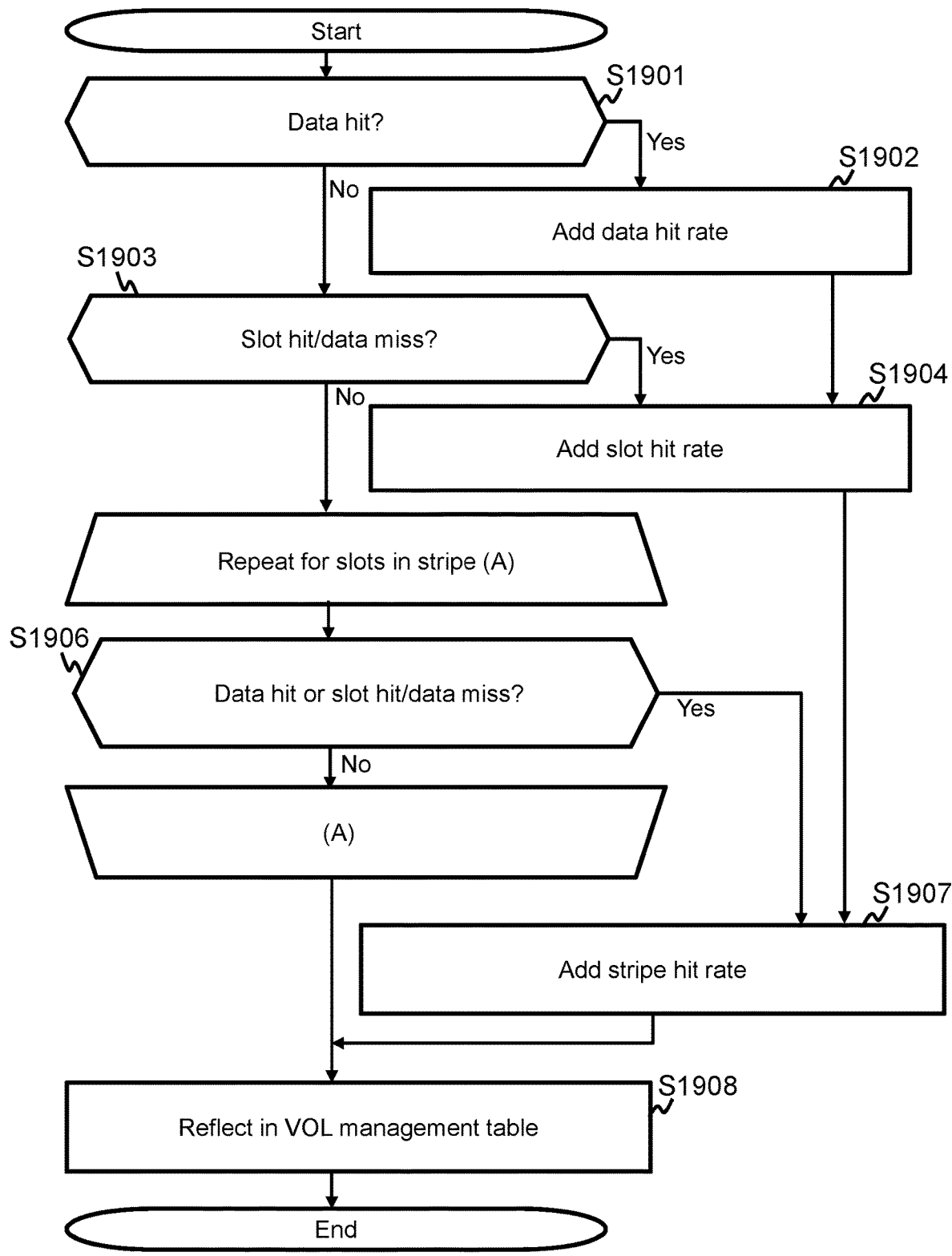
FIG. 19 is a flowchart of hit rate calculation processing according to Embodiment 1.

FIG. 19 is a flowchart of the hit rate calculation processing (S1111).

The hit rate calculation program 49 determines whether the data hit is obtained for the write target data (S1901). When the determination result thereof is positive (S1901: Yes), the hit rate calculation program 49 refers to the VOL management table 52 and adds the data hit rate corresponding to the write destination VOL (S1902). Then, the processing proceeds to Step S1904.

When the determination result of Step S1901 is negative (S1901: No), on the other hand, the hit rate calculation program 49 determines whether the slot hit/data miss is obtained for the write target data (S1903). When the determination result thereof is positive (S1903: Yes), the processing to proceeds to Step S1904. In Step S1904, the hit rate calculation program 49 refers to the VOL management table 52 and adds the write destination VOL corresponding to the slot hit rate. Then, the processing proceeds to Step S1907.

When the determination result of Step S1903 is negative (S1903: No), on the other hand, the hit rate calculation program 49 executes Step S1906 for each slot in the write destination stripe of the write target data. In Step S1906, the hit rate calculation program 49 determines whether the data hit or the slot hit/data miss is obtained for the slot that is the processing target. Step S1907 is performed every time a positive determination result is obtained.

In Step S1907, the hit rate calculation program 49 refers to the VOL management table 52 and adds the stripe hit rate corresponding to the write destination VOL. Then, the processing proceeds to Step S1908.

In Step S1908, the hit rate calculation program 49 reflects the data hit rate, the slot hit rate, and the stripe hit rate corresponding to the write destination VOL (for example, a value in the work area) in the VOL management table 52.

The hit rate calculation processing is executed for each write processing in the example of FIG. 11, but instead may be executed once every N times (N is an integer of 1 or more) the write processing is performed. The stripe hit rate may be updated in response to the number of slots that are the data hit or the slot hit/data miss. The hit rate calculation program 49 may record the total number of times of the hit/miss determination in, for example, the work area, in Step S1901, Step S1903 and Step S1906 to determine the hit rate in Step S1902, Step S1904, and Step S1907 on the basis of the total number of times of the hit/miss determination and the number of times there is a hit.

Figure 20:
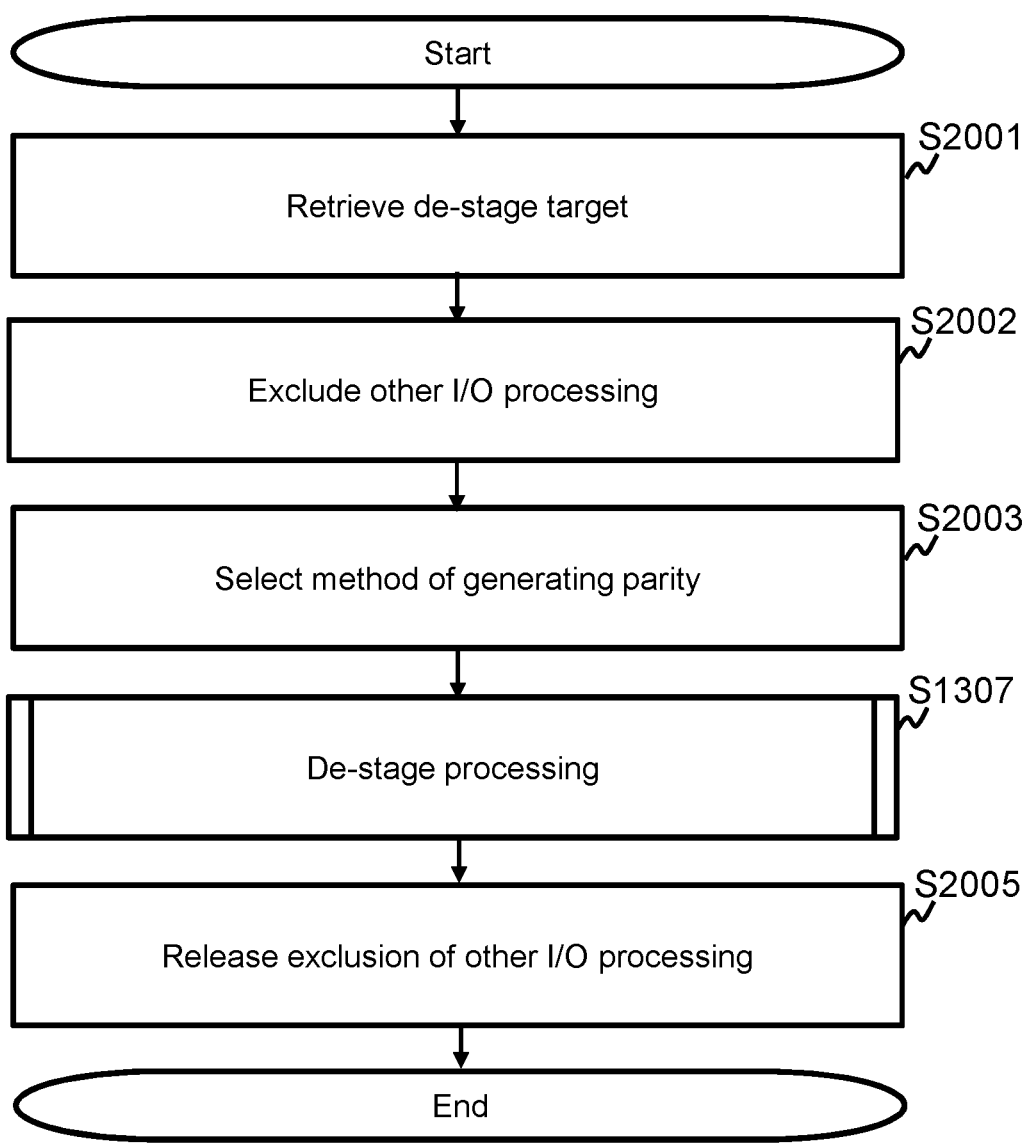
FIG. 20 is a flowchart of asynchronous de-staging processing according to Embodiment 1.

FIG. 20 is a flowchart of the asynchronous de-staging processing.

The asynchronous de-staging program 48 retrieves a de-stage target slot from the cache memory 35 (S2001). Next, the asynchronous de-staging program 48 places the de-stage target slot in a state exclusive of other I/O processing (S2002).

Next, the asynchronous de-staging program 48 selects a method of generating the parity for the stripe to which the de-stage target slot belongs (S2003). The selecting may be performed, for example, on the basis of the number of reserved cache slots corresponding to the stripe (the number of slots reserved in the cache memory 35).

Next, the asynchronous de-staging program 48 executes the de-staging processing (S1307). After the de-staging processing is executed, the asynchronous de-staging program 48 releases the state exclusive of other I/O processing for the de-stage target slot (S2005).

In the asynchronous de-staging processing, the de-stage target slot needs to be retrieved. In the asynchronous de-staging processing, processing of placing the slot of the cache memory 35 in the exclusive state again is necessary at a timing different from the processing when the write request is received (general write processing). The load placed on the processor 24 is higher than the synchronous de-staging processing or the write through processing due to this, for example. In this embodiment, when an increase in the processing efficiency (an increase in the throughput performance of the random write) is expected by the asynchronous de-staging processing, the asynchronous de-staging processing is selected even if the load on the processor is relatively high. However, when the processing efficiency is not expected to increase by the asynchronous de-staging processing, the synchronous de-staging processing or the write through processing is selected. In those processing, the load placed on the processor is lower than in the asynchronous de-staging processing, and hence an increase in the throughput performance of a random write can be expected. This is thought to be especially effective when the PDEV is a PDEV of which I/O performance is high such as the SSD. This is because, when such PDEV is employed, the processor performance of the controller tends to be a bottleneck.

Embodiment 2

Embodiment 2 is described. Differences from Embodiment 1 are mainly described and description of similarities to Embodiment 1 is omitted or simplified.

First, a configuration of a computer system according to Embodiment 2 is described.

Figure 21:
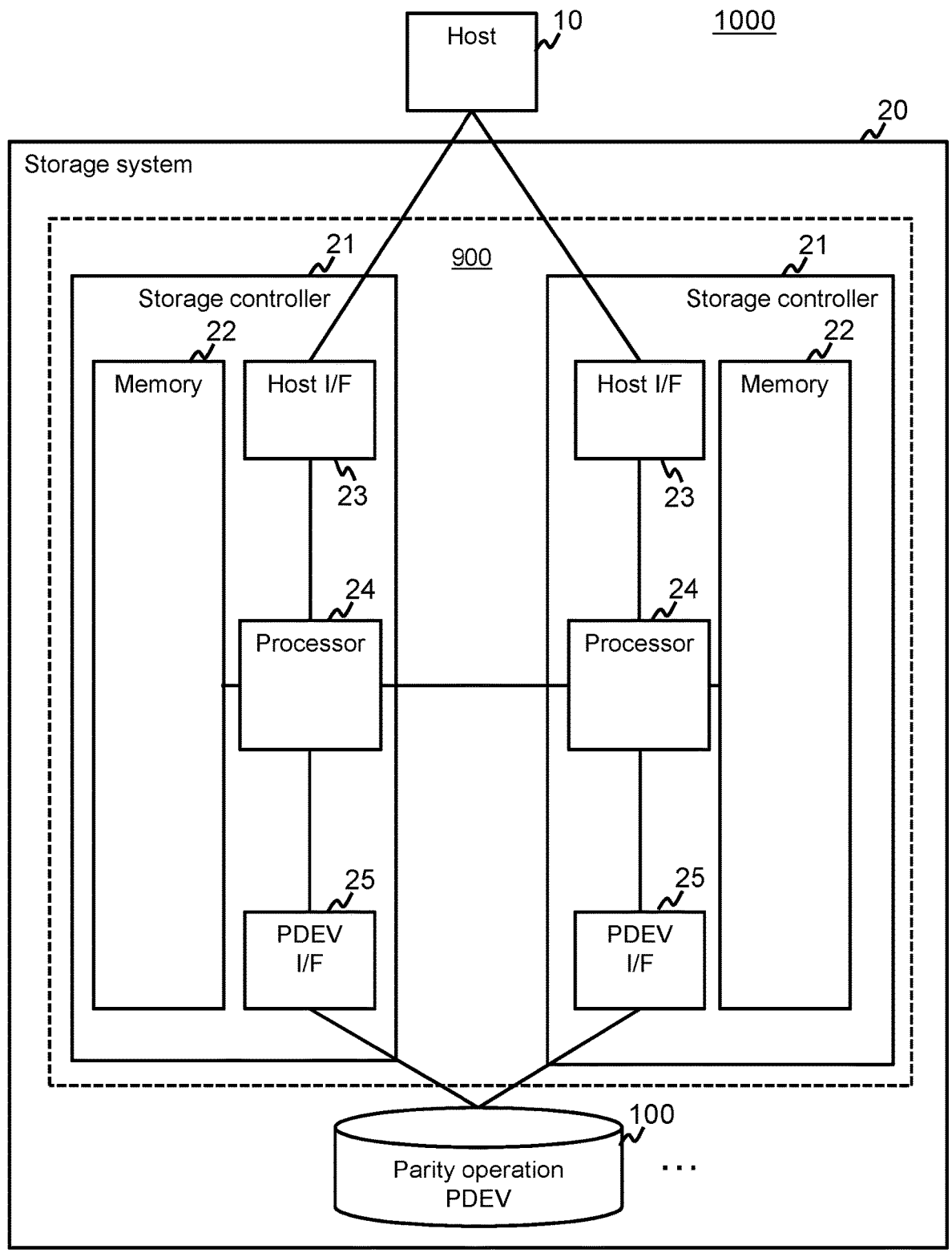
FIG. 21 is a view illustrating a configuration of a computer system according to Embodiment 2.

FIG. 21 is a view illustrating the configuration of the computer system according to Embodiment 2.

In a computer system 1000 according to Embodiment 2, at least one parity group is formed of a plurality of parity operation PDEVs 100. The parity operation PDEV 100 is a PDEV having a parity operation function of operating (generating) a parity. As the parity operation function, for example, there are a function of generating intermediate data by performing an XOR of the new data and the old data and a function of generating a new parity by the intermediate data and the old parity. For example, the parity operation PDEV 100 is an HDD or an SSD having the parity operation function.

FIG. 22 is a view illustrating an example of a PDEV management table according to Embodiment 2.

In the PDEV management table 51, a "parity operation PDEV" is registered to the type 515 of the entry corresponding to the parity group formed of the parity operation PDEVs. The "parity operation PDEV" means that the PDEV is the parity operation PDEV 100.

Figure 23:
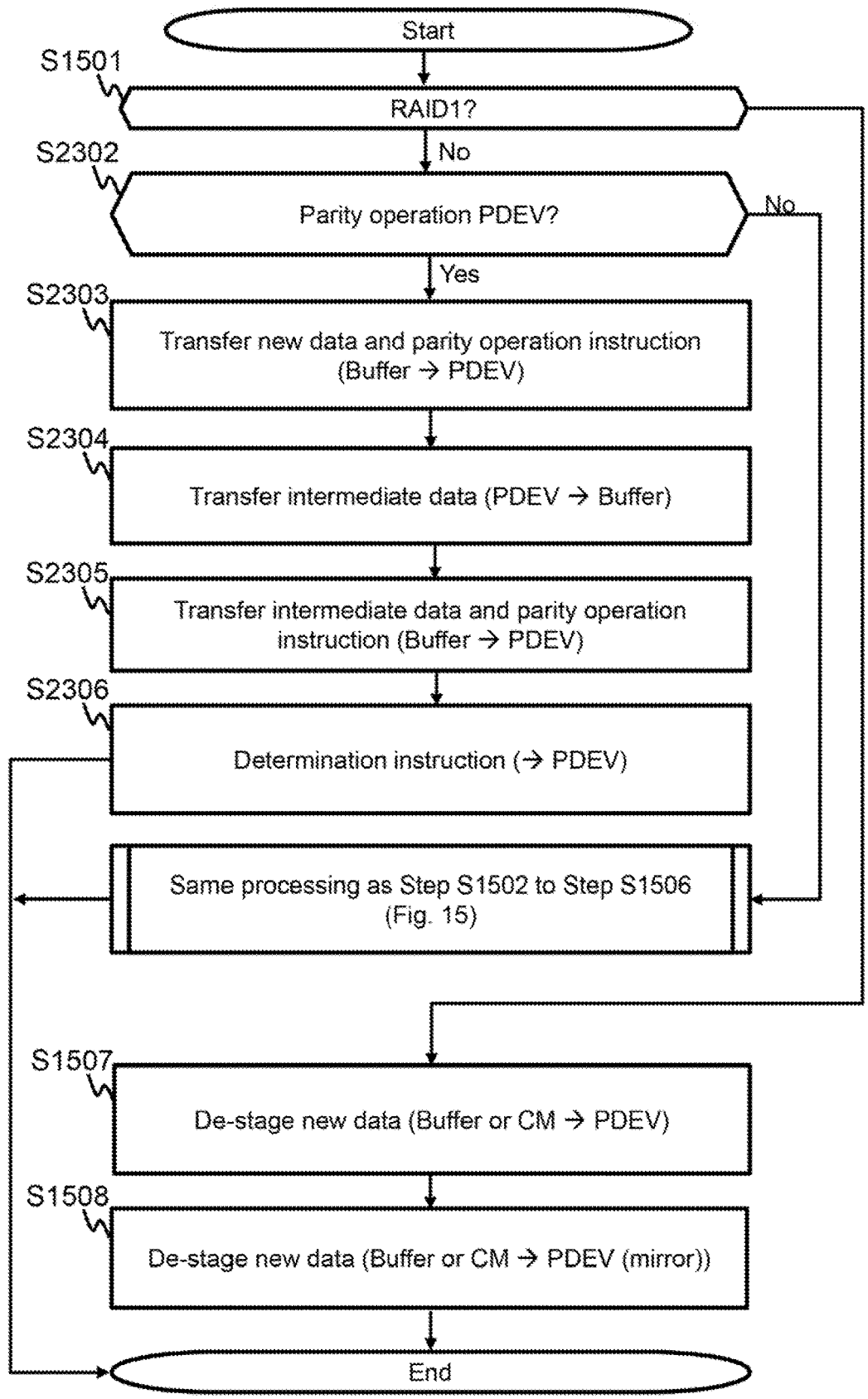
FIG. 23 is a flowchart of de-staging processing according to Embodiment 2.

FIG. 23 is a flowchart of de-staging processing according to Embodiment 2.

In Embodiment 2, in the case of Step S1501: No, the de-staging program 43 refers to the PDEV management table 51 and the VOL management table 52, and determines whether the PDEVs forming the parity group associated with the write destination VOL is the parity operation PDEV (S2302). When the determination result of Step S2302 is negative (S2302: No), Step S1502 to Step S1506 in FIG. 15 are executed.

When the determination result of Step S2302 is positive (S2302: Yes), the de-staging program 43 transfers the new data and an instruction to generate the intermediate data to the parity operation PDEV 100 serving as the storage destination of the new data (S2303). The parity operation PDEV 100 generates the intermediate data with use of the new data in response to that instruction. Next, the de-staging program 43 receives the intermediate data that is obtained through calculation from the parity operation PDEV 100 and stores that intermediate data in the data buffer 34 (S2304). Next, the de-staging program 43 transfers the intermediate data and the instruction to generate a new parity to the parity operation PDEV 100 serving as the storage destination of the new parity (S2305). The parity operation PDEV 100 generates a new parity with use of the intermediate data in response to that instruction.

Next, the de-staging program 43 transfers a determination instruction to the parity operation PDEV 100 serving as the storage destination of the new data and the parity operation PDEV 100 serving as the storage destination of the new parity (S2306). When the parity operation PDEV 100 receives the determination instruction, the parity operation PDEV 100 saves the new data or the new parity in response to the instruction. For example, the parity operation PDEV 100 stores the new data or the new parity from a volatile area (for example, a memory) in that PDEV to a non-volatile area (for example, a hard disk or a flash memory) in that PDEV.

According to this de-staging processing, the parity operation PDEV 100 generates the parity (and generates the intermediate data) and hence the load on the processor 24 may be reduced. For example, when the controller 21 does not include a hardware (for example, ASIC (Application Specific Integrated Circuit)) having the parity operation function, the effect of reducing the load on the processor 24 is high. By causing the parity operation PDEV 100 to execute the parity operation, the processing time of the de-staging processing may be reduced. As a result, the response to the host 10 in the write through processing may be increased in speed.

Several embodiments are described above, but needless to say, this invention is not limited to those embodiments and may be modified in various ways without departing from the scope of this invention.

For example, in the embodiments described above, two thresholds having different values may be prepared as at least one of the thresholds described in Step S1105 to Step S1108 in FIG. 11, to thereby prevent a situation in which the determination result fluctuates due to a small change in the value of the determination target. That is, when the value of the determination target exceeds the higher threshold, the lower threshold is used as the threshold thereafter and when the value of the determination target falls below the lower threshold, the higher threshold is used as the threshold thereafter.

REFERENCE SIGNS LIST

1 Computer system
10 Host system
20 Storage system

The invention claimed is:

1. A storage system, comprising:
a RAID group formed of a plurality of physical storage devices; and
a storage controller including a cache memory and a processor, and configured to
receive, from a host system, a write request which specifies an address of a logical volume associated with the RAID group, wherein a volume space allocated to the logical volume among logical spaces provided by the RAID group is formed of a plurality of blocks in a plurality of volume slots, wherein data is input to and output from the logical volume in units of blocks,
calculate a data hit rate corresponding to the logical volume, wherein the data hit rate is a ratio of the number of block hit write requests to a total number of write requests for the logical volume, and wherein each block hit write request is a write request for a block that was found in the cache memory;
determine whether write target data in accordance with the write request exists in the cache memory, and,
when determining that the write target data does not exist in the cache memory,
determine whether at least one of one or more conditions is met, wherein the one or more conditions comprise a first condition that comprises comparing the data hit rate corresponding to the logical volume to a first threshold, and
determining that the first condition is met when the data hit rate exceeds the first threshold,
when determining that at least one of the one or more conditions is met, select asynchronous de-staging processing for the write request, wherein the asynchronous de-staging processing stores the write target data in the RAID group asynchronously to write processing performed in response to the write request, and,
when determining that none of the one or more conditions are met, select synchronous storage processing for the write request, wherein the synchronous storage processing stores the write target data in the RAID group synchronously to the write processing performed in response to the write request;
wherein the storage controller includes controller units multiplexed by N, where N is an integer of 2 or more, wherein the controller units comprise a first controller unit and a second controller unit,
wherein each of the first controller unit and the second controller unit includes a cache memory and a buffer,
wherein the synchronous storage processing comprises either synchronous de-staging processing or write through processing,
wherein the synchronous de-staging processing comprises writing the write target data to the cache memory or the buffer of the first controller unit and the cache memory or the buffer of the second controller unit, returning a response to the write request to the host system, and then, by at least one of the first controller unit and the second controller unit, writing write target data in the respective cache memory or the buffer to the RAID group,
wherein the write through processing comprises returning a response to the write request to the host system after writing the write target data to the RAID group by any one of the controller units;
wherein the synchronous storage processing comprises:
determining whether a dirty cache rate is higher than a fifth threshold;
when determining that the dirty cache rate is higher than the fifth threshold, selecting the synchronous de-staging processing; and,
when determining that the dirty cache rate is not higher than the fifth threshold, selecting the write through processing,
wherein the dirty cache rate is a ratio of a total amount of dirty data to a capacity of the cache memory of the controller unit having received the write request, and
wherein dirty data is data, in the cache memory of the controller unit having received the write request, that is not written to the RAID group.

2. The storage system according to claim 1, wherein a second one of the one or more conditions is that each of the plurality of physical storage devices forming the RAID group requires a seek operation.

3. The storage system according to claim 1, wherein a second one of the one or more conditions is that a write in accordance with the write request is a sequential write.

4. The storage system according to claim 1, wherein a second one of the one or more conditions is that a slot hit rate corresponding to the logical volume is higher than a second threshold, wherein each of the plurality of volume slots is formed of a plurality of blocks and corresponds to any one of the plurality of physical storage devices, wherein the slot hit rate is a ratio of the number of volume slot hit write requests to a total number of the write requests, and wherein each volume slot hit write request is a write request for a volume slot that was found in the cache memory.

5. The storage system according to claim 1, wherein a second one of the one or more conditions is that a stripe hit rate corresponding to the logical volume is higher than a third threshold, wherein the volume space allocated to the logical volume among logical spaces provided by the RAID group is formed of a plurality of stripes, wherein the plurality of stripes are formed of two or more of the plurality of volume slots corresponding to two or more physical storage devices, wherein each of the two or more of the plurality of volume slots is formed of a plurality of blocks, wherein the stripe hit rate is a ratio of the number of stripe hit write requests to a total number of the write requests, and wherein the stripe hit write request is a write request for a stripe that was found in the cache memory.

6. The storage system according to claim 1, wherein a second one of the one or more conditions is that a load on the processor is lower than a fourth threshold.

7. The storage system according to claim 1,
wherein the storage controller includes controller units multiplexed by N, where N is an integer of 2 or more,
wherein the controller units comprise a first controller unit and a second controller unit,
wherein each of the first controller unit and the second controller unit includes a cache memory and a buffer,
wherein the synchronous storage processing comprises synchronous de-staging processing, and
wherein the synchronous de-staging processing comprises writing the write target data to the cache memory or the buffer of the first controller unit and the cache memory or the buffer of the second controller unit, returning a response to the write request to the host system, and then, by at least one of the first controller unit and the second controller unit, writing write target data in the respective cache memory or the buffer to the RAID group.

8. The storage system according to claim 1,
wherein the storage controller includes controller units multiplexed by N, where N is an integer of 2 or more,
wherein the synchronous storage processing comprises write through processing, and
wherein the write through processing comprises returning a response to the write request to the host system after writing the write target data to the RAID group by any one of the controller units.

9. The storage system according to claim 1,
wherein the RAID group utilizes parity, and
wherein the storage controller is configured to, when a parity is needed in at least one of the asynchronous de-staging processing and the synchronous storage processing, cause a physical storage device that is a storage destination of the parity to generate the parity.

10. A data writing control method by a storage controller, the method comprising:
  receiving, from a host system, a write request which specifies an address of a logical volume associated with a RAID group, wherein a volume space allocated to the logical volume among logical spaces provided by the RAID group is formed of a plurality of blocks in a plurality of volume slots, wherein data is input to and output from the logical volume in units of blocks;
  calculating a data hit rate corresponding to the logical volume, wherein the data hit rate is a ratio of the number of block hit write requests to a total number of write requests for the logical volume, and wherein each block hit write request is a write request for a block that was found in the cache memory;
  determining whether write target data in accordance with the write request exists in a cache memory; and,
  when determining that the write target data does not exist in the cache memory,
    determining whether at least one of one or more conditions is met, wherein the one or more conditions comprise a first condition that comprises comparing the data hit rate corresponding to the logical volume to a first threshold, and,
    determining that the first condition is met when the data hit rate exceeds the first threshold,
  when determining that at least one of the one or more conditions is met, selecting asynchronous de-staging processing for the write request, wherein the asynchronous de-staging processing stores the write target data in the RAID group asynchronously to write processing performed in response to the write request, and,
  when determining that none of the one or more conditions are met, selecting synchronous storage processing for the write request, wherein the synchronous storage processing stores the write target data in the RAID group synchronously to the write processing performed in response to the write request;
wherein the storage controller includes controller units multiplexed by N, where N is an integer of 2 or more,
wherein the controller units comprise a first controller unit and a second controller unit,
wherein each of the first controller unit and the second controller unit includes a cache memory and a buffer,
wherein the synchronous storage processing comprises either synchronous de-staging processing or write through processing,
wherein the synchronous de-staging processing comprises writing the write target data to the cache memory or the buffer of the first controller unit and the cache memory or the buffer of the second controller unit, returning a response to the write request to the host system, and then, by at least one of the first controller unit and the second controller unit, writing write target data in the respective cache memory or the buffer to the RAID group,
wherein the write through processing comprises returning a response to the write request to the host system after writing the write target data to the RAID group by any one of the controller units;
wherein the synchronous storage processing comprises:
  determining whether a dirty cache rate is higher than a fifth threshold;
  when determining that the dirty cache rate is higher than the fifth threshold, selecting the synchronous de-staging processing; and,
  when determining that the dirty cache rate is not higher than the fifth threshold, selecting the write through processing,
wherein the dirty cache rate is a ratio of a total amount of dirty data to a capacity of the cache memory of the controller unit having received the write request, and
wherein dirty data is data, in the cache memory of the controller unit having received the write request, that is not written to the RAID group.

* * * * *